United States Patent
Kashima

(10) Patent No.: US 9,197,145 B2
(45) Date of Patent: Nov. 24, 2015

(54) MOTOR CONTROL APPARATUS AND POWER STEERING APPARATUS

(71) Applicant: HITACHI AUTOMOTIVE SYSTEMS STEERING, LTD., Hiki-gun, Saitama (JP)

(72) Inventor: Masaki Kashima, Ebina (JP)

(73) Assignee: HITACHI AUTOMOTIVE SYSTEMS STEERING, LTD., Hiki-Gun (JP)

( * ) Notice: Subject to any disclaimer, the term of this patent is extended or adjusted under 35 U.S.C. 154(b) by 0 days.

(21) Appl. No.: 14/223,593

(22) Filed: Mar. 24, 2014

(65) Prior Publication Data

US 2014/0297131 A1    Oct. 2, 2014

(30) Foreign Application Priority Data

Mar. 25, 2013    (JP) ................................ 2013-062334

(51) Int. Cl.
*H02P 6/00* (2006.01)
*B62D 5/04* (2006.01)
*H02P 6/08* (2006.01)
*H02P 21/00* (2006.01)

(52) U.S. Cl.
CPC .............. *H02P 6/002* (2013.01); *B62D 5/046* (2013.01); *H02P 6/085* (2013.01); *H02P 21/0035* (2013.01)

(58) Field of Classification Search
CPC ............................... B62D 5/046; H02P 6/002
USPC ................... 701/41–42; 318/400.17
See application file for complete search history.

(56) References Cited

U.S. PATENT DOCUMENTS

| | | | | |
|---|---|---|---|---|
| 6,465,973 B1* | 10/2002 | Kato et al. | ............... | 318/400.32 |
| 7,102,322 B2* | 9/2006 | Suzuki | ............ | 318/801 |
| 7,141,943 B2* | 11/2006 | Song et al. | ............... | 318/400.34 |
| 7,141,945 B2* | 11/2006 | Harada | ................ | 318/400.17 |
| 7,336,047 B2* | 2/2008 | Ueda et al. | ................ | 318/432 |
| 7,576,503 B2* | 8/2009 | Nakanishi et al. | ....... | 318/400.01 |
| 7,847,498 B2* | 12/2010 | Shibuya | ................ | 318/400.01 |
| 8,035,325 B2* | 10/2011 | Takeuchi et al. | ......... | 318/400.01 |
| 8,067,910 B2* | 11/2011 | Sejimo | ................ | 318/400.01 |
| 8,766,574 B2* | 7/2014 | Dorner et al. | ............ | 318/400.14 |
| 8,884,562 B1* | 11/2014 | Cameron, Jr. | ............ | 318/400.29 |
| 8,937,446 B2* | 1/2015 | Clothier et al. | ......... | 318/400.37 |
| 8,988,021 B2* | 3/2015 | Clothier et al. | ......... | 318/400.01 |
| 9,065,367 B2* | 6/2015 | Greetham | ............ | 1/1 |
| 2008/0048598 A1* | 2/2008 | Shibuya | ............ | 318/400.1 |
| 2008/0067960 A1* | 3/2008 | Maeda et al. | ............ | 318/400.02 |
| 2008/0217099 A1* | 9/2008 | Reungwetwattana et al. | ................ | 180/446 |
| 2008/0246424 A1* | 10/2008 | Takeuchi et al. | ......... | 318/400.17 |

(Continued)

FOREIGN PATENT DOCUMENTS

JP    2001-327173 A    11/2001

*Primary Examiner* — James Trammell
*Assistant Examiner* — Atul Trivedi
(74) *Attorney, Agent, or Firm* — Foley & Lardner LLP

(57) ABSTRACT

The present invention performs pulse shift control in such a manner that a difference between switching timings of PWM duty signals can reach or exceed a second predetermined value when the difference between the switching timings of the PWM duty signals of phases falls below the first predetermined value, and determines a correction amount for the phase by the pulse shift control in such a manner that a correction amount after switching becomes smaller than a correction amount before the switching of a phase on which the pulse shift control is performed in pulse shift phase switching control.

17 Claims, 9 Drawing Sheets

(56) References Cited

U.S. PATENT DOCUMENTS

| | | | |
|---|---|---|---|
| 2008/0277191 A1* | 11/2008 | Kasai | 180/444 |
| 2009/0108782 A1* | 4/2009 | Klatt | 318/400.17 |
| 2009/0133955 A1* | 5/2009 | Morikawa et al. | 180/444 |
| 2010/0001680 A1* | 1/2010 | Sasaki et al. | 318/675 |
| 2010/0259206 A1* | 10/2010 | Joachimsmeyer | 318/400.17 |
| 2011/0214934 A1* | 9/2011 | Ueda et al. | 180/446 |
| 2012/0306416 A1* | 12/2012 | Hano | 318/400.26 |
| 2013/0069575 A1* | 3/2013 | Hano et al. | 318/400.34 |
| 2013/0277123 A1* | 10/2013 | Klatt | 180/6.44 |
| 2013/0277974 A1* | 10/2013 | Klatt | 290/50 |

* cited by examiner

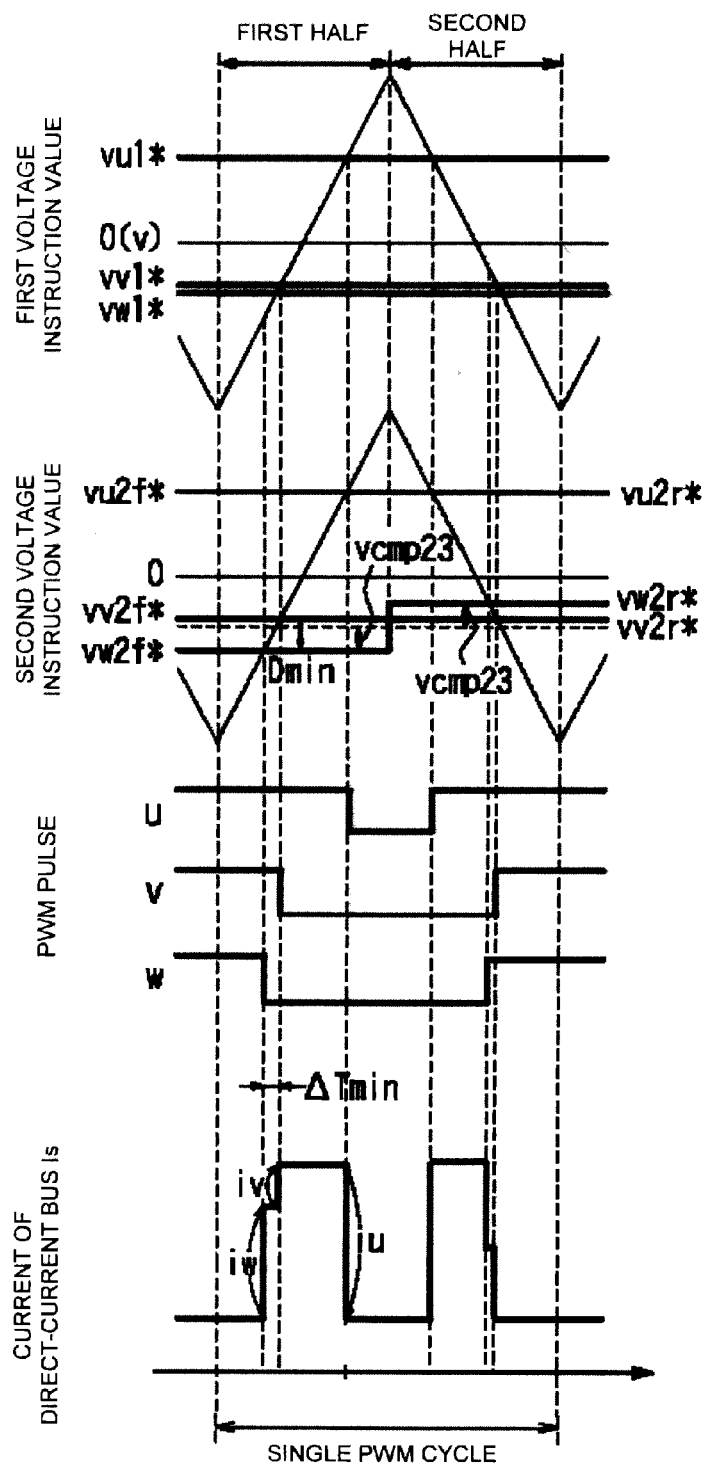

MOTOR CONTROL APPARATUS AND POWER STEERING APPARATUS

BACKGROUND OF THE INVENTION

The present invention relates to a motor control apparatus and a power steering apparatus.

Japanese Patent Application Public Disclosure No. 2001-327173 (hereinafter referred to as a patent document 1) discloses an example of this technique. The patent document 1 discloses an invention that detects a current value of each phase by detecting a current passing through a direct-current bus. At this time, this invention increases an instruction voltage value of a maximum phase instruction voltage value in a first half of a PWM cycle by a correction amount set according to a difference between the maximum phase instruction voltage value and a middle phase instruction voltage value, and reduces an instruction voltage value in a second half of the PWM cycle by the correction amount corresponding to the previous increase, when the difference between the maximum phase instruction voltage value and the middle phase instruction voltage value (a second phase instruction voltage value) is smaller than a predetermined value. Further, the invention reduces an instruction voltage value of a minimum phase instruction voltage value in the first half of the PWM cycle by a correction amount set according to a difference between the middle phase instruction voltage value and the minimum phase instruction voltage value, and increases an instruction voltage value in the second half of the PWM cycle by the correction amount corresponding to the previous reduction, when the difference between the middle phase instruction voltage value and the minimum phase instruction voltage value is smaller than a predetermined value. Hereinafter, this correction will be referred to as a pulse shift.

According to the technique discussed in the patent document 1, the voltage of the phase on which the pulse shift is performed reduces instantaneously when the instruction voltage value is corrected downwardly, and increases instantaneously when the instruction voltage value is corrected upwardly, resulting in generation of a current ripple. At this time, the current ripple is generated around a voltage value different from a sum of the instruction voltage values of the respective phases, thereby leading to a possibility of a reduction in accuracy of current detection.

SUMMARY OF INVENTION

The present invention has been contrived in consideration of the above-described problem, and an object thereof is to provide a motor control apparatus and a power steering apparatus capable of improving accuracy of current detection even when a current ripple is generated due to the pulse shift.

According to an aspect of the present invention, a motor control apparatus and a power steering apparatus perform pulse shift control in such a manner that a difference between switching timings of PWM duty signals can reach or exceed a second predetermined value when the difference between the switching timings of the PWM duty signals of phases falls below a first predetermined value, and sets a correction amount ($\Delta Vu2^*$, $\Delta Vv2^*$, $\Delta Vw2^*$) for the phase of the PWM duty signal corresponding to the switching timing at a time that is not a timing of direct-current bus current detection to a smaller amount than a correction amount ($\Delta Vu1^*$, $\Delta Vv1^*$, $\Delta Vw1^*$) for the phase of the PWM duty signal.

According to an aspect of the present invention, a motor control apparatus is configured to drive and control a three-phase brushless motor configured to rotationally drive a driving shaft of an apparatus installed on a vehicle. The motor control apparatus comprises:

an instruction current calculation unit configured to calculate an instruction current value to the three-phase brushless motor based on a driving state of the vehicle;

a PWM control unit configured to output a PWM duty signal to each phase of the three-phase brushless motor according to the instruction current value;

a bridge circuit including a switching circuit configured to be driven and controlled by the PWM duty signal, and configured to drive and control the three-phase brushless motor;

a current sensor provided at a direct-current bus connected to the bridge circuit, and configured to detect a direct-current bus current passing through the direct-current bus;

a phase current calculation unit configured to estimate current values of respective phases based on the direct-current bus current when the PWM duty signal of a maximum phase corresponding to a longest power supply time is turned on and the duty signals of a minimum phase corresponding to a shortest power supply time and a middle phase are turned off among the PWM duty signals to the respective phases of the three-phase brushless motor, and the direct-current bus current when the PWM duty signal of the maximum phase is turned on and the PWM duty signal of the middle phase is turned on;

a current feedback circuit configured to perform a feedback correction on the instruction current value based on the current values of the respective phases estimated by the phase current calculation unit;

a pulse shift control circuit configured to perform pulse shift control of correcting a phase of the PWM duty signal of the maximum or the middle phase corresponding to a timing when the PWM duty signal of the maximum or the middle phase is turned on in such a manner that a difference between the timing when the PWM duty signal of the maximum phase is turned on and the timing when the PWM duty signal of the middle phase is turned on can reach or exceed a second predetermined value larger than a first predetermined value when the difference between the timing when the PWM duty signal of the maximum phase is turned on and the timing when the PWM duty signal of the middle phase is turned on falls below the first predetermined value, and correcting a phase of the PWM duty signal of the middle or minimum phase in such a manner that a difference between the timing when the PWM duty signal of the middle phase is turned on and a timing when the PWM duty signal of the minimum phase is turned on can reach or exceed the second predetermined value when the difference between the timing when the PWM duty signal of the middle phase is turned on and the timing when the PWM duty signal of the minimum phase is turned on falls below the first predetermined value;

a pulse shift phase switching control unit provided at the pulse shift control circuit, and configured to perform pulse shift phase switching control of switching a control target phase on which the pulse shift control is performed, when the middle phase or the minimum phase is changed into the maximum phase, or the maximum phase or the middle phase is changed into the minimum phase according to a change in the instruction current value; and a phase switching subsequent correction amount calculation unit provided at the pulse shift control circuit, and configured to perform phase switching subsequent correction amount adjustment control of determining a correction amount for the phase by the pulse shift control in such a manner that a correction amount after the switching becomes smaller than a correction amount before the switching of the phase for which the pulse shift control is performed in the pulse shift switching control.

According to an aspect of the present invention, a power steering apparatus comprises:

a steering mechanism configured to turn a wheel to be steered according to a steering operation performed on a steering wheel;

a three-phase brushless motor configured to provide a steering force to the steering mechanism;

a control apparatus configured to drive and control the three-phase brushless motor;

an instruction current calculation unit provided at the control apparatus, and configured to calculate an instruction current value to the three-phase brushless motor based on a driving state of the vehicle;

a PWM control unit provided at the control apparatus, and configured to output a PWM duty signal to each phase of the three-phase brushless motor according to the instruction current value;

a bridge circuit provided at the control apparatus, including a switching circuit configured to be driven and controlled by the PWM duty signal, and configured to drive and control the three-phase brushless motor;

a current sensor provided at a direct-current bus connected to the bridge circuit, and configured to detect a direct-current bus current passing through the direct-current bus;

a phase current calculation unit provided at the control apparatus, and configured to estimate current values of respective phases based on the direct-current bus current when the PWM duty signal of a maximum phase corresponding to a longest power supply time is turned on and the duty signals of a minimum phase corresponding to a shortest power supply time and a middle phase are turned off among the PWM duty signals to the respective phases of the three-phase brushless motor, and the direct-current bus current when the PWM duty signal of the maximum phase is turned on and the PWM duty signal of the middle phase is turned on;

a current feedback circuit provided at the control apparatus, and configured to perform a feedback correction on the instruction current value based on the current values of the respective phases estimated by the phase current calculation unit;

a pulse shift control circuit provided at the control apparatus, and configured to perform pulse shift control of correcting a phase of the PWM duty signal of the maximum or the middle phase corresponding to a timing when the PWM duty signal of the maximum or the middle phase is turned on in such a manner that a difference between the timing when the PWM duty signal of the maximum phase is turned on and the timing when the PWM duty signal of the middle phase is turned on can reach or exceed a second predetermined value larger than a first predetermined value when the difference between the timing when the PWM duty signal of the maximum phase is turned on and the timing when the PWM duty signal of the middle phase is turned on falls below the first predetermined value, and correcting a phase of the PWM duty signal of the middle or minimum phase in such a manner that a difference between the timing when the PWM duty signal of the middle phase is turned on and a timing when the PWM duty signal of the minimum phase is turned on can reach or exceed the second predetermined value when the difference between the timing when the PWM duty signal of the middle phase is turned on and the timing when the PWM duty signal of the minimum phase is turned on falls below the first predetermined value;

a pulse shift phase switching control unit provided at the pulse shift control circuit, and configured to perform pulse shift phase switching control of switching a control target phase on which the pulse shift control is performed when the middle phase or the minimum phase is changed into the maximum phase, or the maximum phase or the middle phase is changed into the minimum phase according to a change in the instruction current value; and a phase switching subsequent correction amount calculation unit provided at the pulse shift control circuit, and configured to determine a correction amount for the phase by the pulse shift control in such a manner that a correction amount after the switching becomes smaller than a correction amount before the switching of the phase for which the pulse shift control is performed in the pulse shift switching control.

BRIEF DESCRIPTION OF DRAWINGS

FIG. 9A, FIG. 9B, FIG. 9C and FIG. 9D illustrates waveform charts for explaining a current detecting method according to the related art.

DESCRIPTION OF EMBODIMENTS

First Embodiment

Overall Configuration of Power Steering Apparatus

Figure 1:
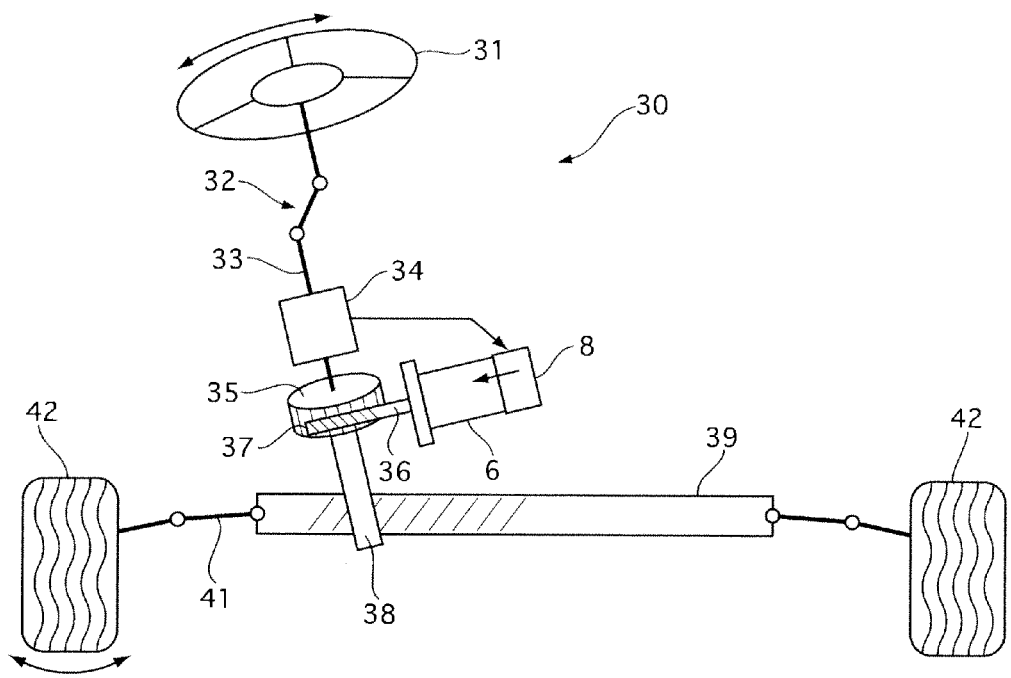
FIG. 1 illustrates an overall configuration of an electric power steering apparatus according to a first embodiment of the present invention.

FIG. 1 illustrates an overall configuration of an electric power steering apparatus 30.

The electric power steering apparatus 30 includes a steering wheel 31, to which a driver's steering operation is input, a wheel turning shaft 33 connected to the steering wheel 31, a pinion 38 rotatable integrally with the wheel turning shaft 33, a rack 39 meshed with the pinion 38 to convert a rotational motion of the pinion 38 into a linear motion, and a tie rod 41 that transmits the motion of the rack 39 to a wheel 42 to be steered. They constitute a steering mechanism 32 that transmits a steering operation applied on the steering wheel 31 to the wheel 42 to be steered. Further, a torque sensor 34 that detects a steering torque input into the steering wheel 31, and a worm wheel 35 rotatable integrally with the wheel turning shaft 33 are provided at the wheel steering shaft 33. A worm shaft 37 is meshed with the worm wheel 35. The worm shaft 37 is connected to a driving shaft 36 of an electric motor 6, which provides an assist force to a steering force. The electric motor 6 is a three-phase brushless motor, and is controlled by a motor control unit 8. The motor control unit 8 controls a steering force to be provided by the electric motor 6 according to a steering torque detected by the torque sensor 34 and a vehicle operation condition such as a vehicle speed.

[Configuration of Motor Control Unit]

Figure 2:
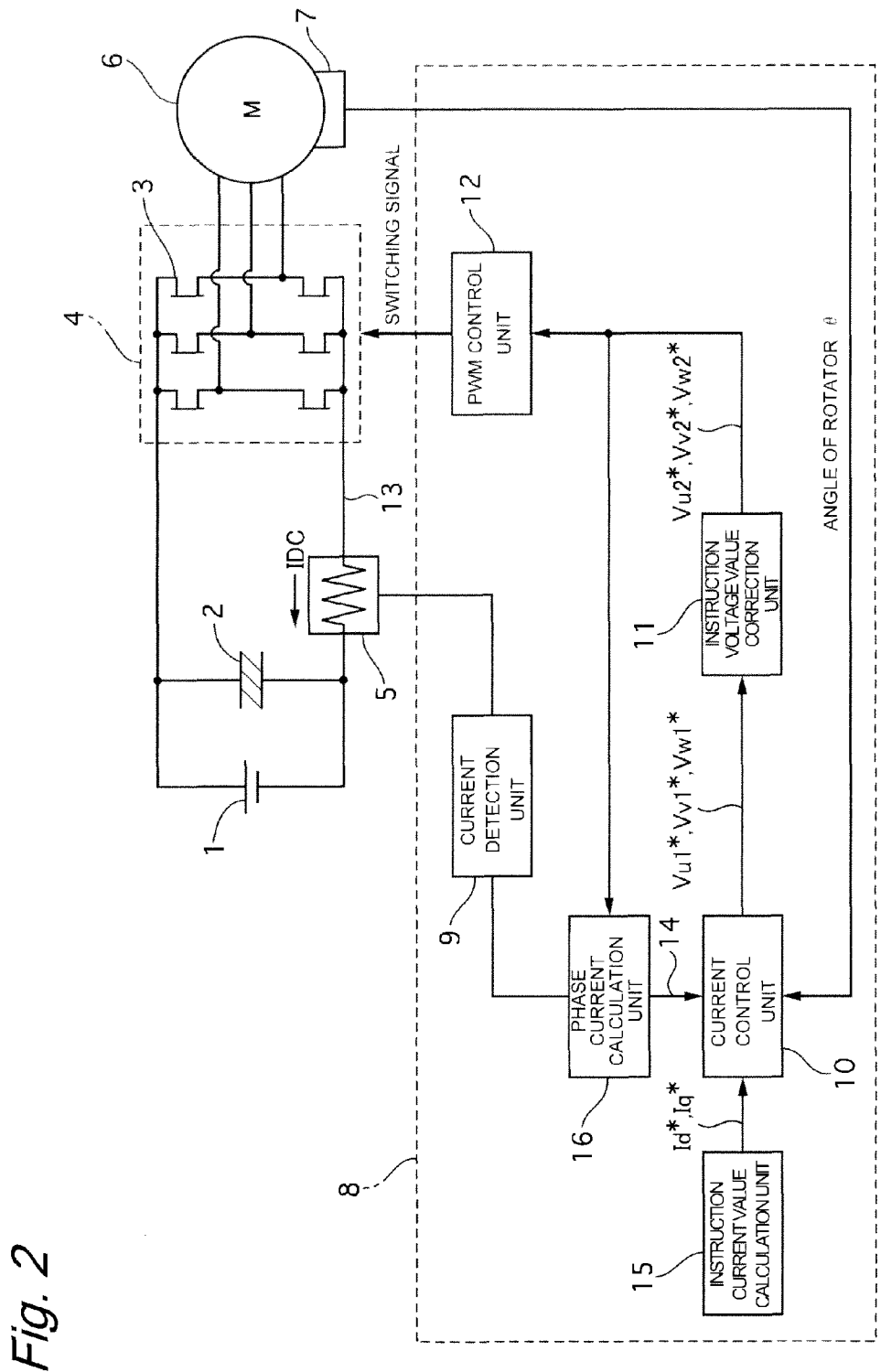
FIG. 2 illustrates a driving circuit of an electric motor and control blocks of a motor control unit according to the first embodiment.

FIG. 2 illustrates a driving circuit of the electric motor 6 and control blocks of the motor control unit 8.

The driving circuit of the electric motor 6 includes a direct-current power source 1, a smoothing capacitor 2 connected in parallel with the direct-current power source 1, and a three-phase bridge circuit 4 including six switching elements 3. The electric motor 6 is driven by a u-phase current, a v-phase current, and a w-phase current supplied from the three-phase bridge circuit 4. A rotator angle sensor 7, which detects a rotational angle θ of a rotator, is provided at the electric motor 6. A shunt resistance (a current sensor) 5 is provided at a direct-current bus 13, which connects the direct-current power source 1 and the three-phase bridge circuit 4.

The motor control unit 8 includes an instruction current value calculation unit 15 that calculates instruction current values Id* and Iq*, a current control unit 10 that calculates first instruction voltage values Vu1*, Vv1*, and Vw1*, an instruction voltage value correction unit 11 that calculates second instruction voltage values Vu2*, Vv2*, and Vw2*, a PWM control unit 12 that generates a switching signal (a PWM pulse or a PWM duty signal), a current detection unit 9 that detects a current passing through the shunt resistance 5, and a phase current calculation unit 16 that calculates a current value of each phase. The current control unit 10 functions as a current feedback circuit 14 that performs a feedback correction on the instruction current values based on the current value of each of the u, v, and w phases, which is estimated by the phase current calculation unit 16.

The instruction current value calculation unit 15 calculates the instruction current values Id* and Iq* according to a detected steering torque. The current control unit 10 calculates the first instruction voltage values Vu1*, Vv1*, and Vw1* from the current instruction values Id* and Iq*, the rotator angle θ, and the current values of the respective phases. The instruction voltage value correction unit 11 calculates the second instruction voltage values Vu2*, Vv2*, and Vw2* by correcting the first instruction voltage values Vu1*, Vv1*, and Vw1*. The PWM control unit 12 generates a switching signal by comparing the second instruction voltage values Vu2*, Vv2*, and Vw2* and a triangular wave carrier signal. The current detection unit 9 detects a value of a direct-current bus current IDC passing through the shunt resistance 5.

The phase current calculation unit 16 calculates the current values of the respective phases from the second instruction voltage values Vu2*, Vv2*, and Vw2* and the direct-current bus current IDC. The direct-current bus current IDC passing through the shunt resistance 5 is generated in the following manner. An alternating-current voltage is generated from a direct-current voltage by switching of the three-phase bridge circuit 4, and currents iu, iv, and iw of the three phases are supplied to the electric motor 6. The direct-current bus current IDC passes through the shunt resistance 5 as an instantaneous current by an instantaneous voltage generated due to a difference in a switching timing of the three-phase bridge circuit 4. An AD timing determined by a not-illustrated AD conversion circuit, and which current is the direct-current bus current IDC among the three-phase currents are calculated or determined based on the signals of the second instruction voltage values Vu2*, Vv2*, and Vw2*. For example, as exemplified in the patent document 1, FIG. 4 and paragraphs [0026] to [0028], the phase currents iu, iv, and iw are calculated from PWM duty signals acquired from the second instruction voltage values Vu2*, Vv2*, and Vw2*, and the direct-current bus current IDC. For facilitating better understanding, FIG. 4 in the patent document 1 is included in the present disclosure as FIG. 9. In this example, assuming that the u phase, v phase, and w phase are a maximum phase, a middle phase, and a minimum phase, respectively, the phase current iu of the u phase (the maximum phase) is calculated from the direct-current bus current when the PWM duty signal of the u phase (the maximum phase) is turned on and the PWM duty signals of the w phase (the minimum phase) and the v phase (the middle phase) are turned off (refer to the patent document 1, FIG. 4(d)). Further, the phase current iw of the w phase (the minimum phase) is calculated from the direct-current bus current when the PWM duty signals of the u phase (the maximum phase) and the v phase (the middle phase) are turned on and the PWM duty signal of the w phase (the minimum phase) is turned off. Then, the phase current iv of the v phase is calculated from a difference between the phase currents iu and iw. In this example, the first voltage instruction values vv1* and vw1* of the v phase and the w phase are close to each other. Therefore, a pulse shift is performed in such a manner that, in a first half of a PWM cycle, the first voltage instruction value vv1* of the v phase is set as the second voltage instruction value vv2f* without any correction made thereto, and a value resulting from subtraction of vcmp23 from the first voltage instruction value vw1* of the w phase is set as the second voltage instruction value vw2f*, by which the second voltage instruction values vv2f* and vw2f* are separated from each other by Dmini, securing an interval ΔTmin as an interval between switching timings of the PWM duty signals.

[Configuration of Instruction Voltage Value Correction Unit]

Figure 3:
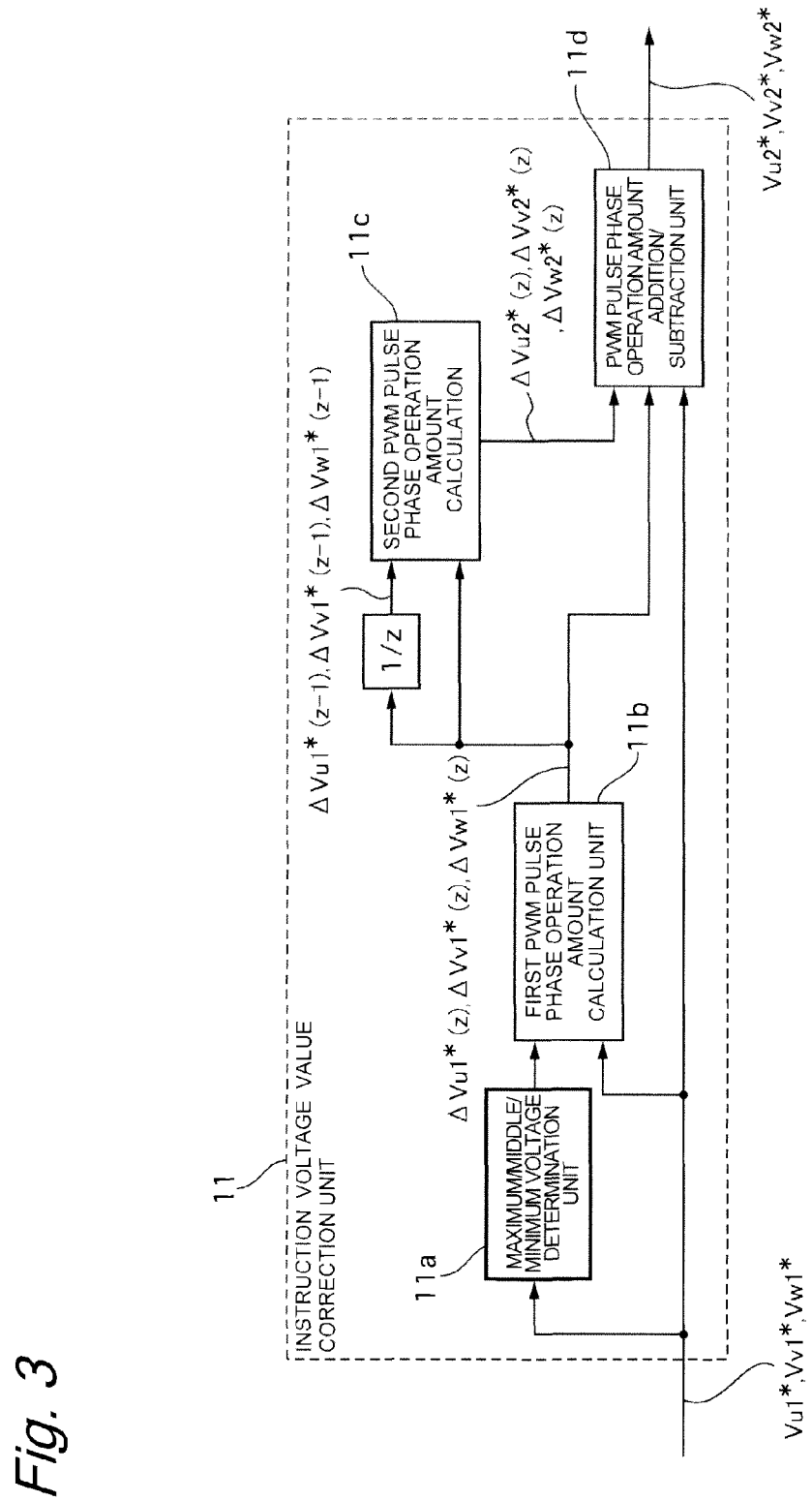
FIG. 3 illustrates control blocks of an instruction voltage value correction unit according to the first embodiment.

FIG. 3 illustrates control blocks of the instruction voltage value correction unit 11.

A maximum/middle/minimum voltage determination unit 11a outputs a maximum instruction voltage value among the first instruction voltage values Vu1*, Vv1*, and Vw1* as a maximum phase, a second maximum instruction voltage value among the first instruction voltage values Vu1*, Vv1*, and Vw1* as a middle phase, and a minimum instruction voltage value among the first instruction voltage values Vu1*, Vv1*, and Vw1* as a minimum phase.

A first PWM pulse phase operation amount calculation unit 11b inputs information of the maximum phase, the middle phase, and the minimum phase, and the first instruction voltage values Vu1*, Vv1*, and Vw1*. The first PWM pulse phase operation amount calculation unit 11b calculates a PWM pulse phase operation amount ΔVmaxc of the maximum phase based on the voltage of the middle phase from an interphase voltage difference between the voltage of the maximum phase and the voltage of the middle phase. The first PWM pulse phase operation amount calculation unit 11b calculates a PWM pulse phase operation amount ΔVminc of the minimum phase based on the voltage of the middle phase from an interphase voltage difference between the voltage of the middle phase and the voltage of the minimum phase. The PWM pulse phase operation amount ΔVmaxc of the maximum phase and the PWM pulse phase operation amount ΔVminc of the minimum phase are set so as to secure a second predetermined value larger than a required minimum time (a first predetermined value) for the current detection unit 9 to detect the instantaneous current passing through the direct-current bus. The PWM pulse phase operation amount ΔVmaxc of the maximum phase and the PWM pulse phase operation amount ΔVminc of the minimum phase are distributed to first PWM pulse phase operation amounts ΔVu1*(z), ΔVv1*(z), and ΔVw1*(z) so as to correspond to the maximum phase, the middle phase, and the minimum phase among the first instruction voltage values Vu1*, Vv1*, and Vw1*. If the rotator angle sensor 7 determines that a load on the electric motor 6 or a rotational speed is increased, the first PWM pulse phase operation amounts ΔVu1*(z), ΔVv1*(z), and ΔVw1*(z) are reduced.

A second PWM pulse phase operation amount calculation unit 11C calculates second PWM pulse phase operation amounts ΔVu2*(z), ΔVv2*(z), and ΔVw2*(z) from the first PWM pulse phase operation amounts ΔVu1*(z), ΔVv1*(z), and ΔVw1*(z) in a present control cycle and first PWM pulse phase operation amounts ΔVu1*(z−1), ΔVv1*(z−1), and ΔVw1*(z−1) in a previous control cycle. The second PWM pulse phase operation amounts ΔVu2*(z), ΔVv2*(z), and ΔVw2*(z) are calculated by the following equation (1).

$$\Delta Vu2^*(z)=(\Delta Vu1^*(z)+\Delta Vu1^*(z-1))/2$$

$$\Delta Vv2^*(z)=(\Delta Vv1^*(z)+\Delta Vv1^*(z-1))/2$$

$$\Delta Vw2^*(z)=(\Delta Vw1^*(z)+\Delta Vw1^*(z-1))/2 \qquad (1)$$

A PWM pulse phase operation amount addition/subtraction unit 11d inputs the first instruction voltage values Vu1*, Vv1*, and Vw1*, the first PWM pulse phase operation amounts ΔVu1*(z), ΔVv1*(z), and ΔVw1*(z), and the second PWM pulse phase operation amounts ΔVu2*(z), ΔVv2*(z), and ΔVw2*(z), and calculates the second instruction voltage values Vu2*, Vv2*, and Vw2*. The second instruction voltage values Vu2*, Vv2*, and Vw2* are set according to a PWM half cycle for increasing a voltage difference among the respective phases to allow the current detection unit 9 to detect the instantaneous current passing through the direct-current bus, a PWM half cycle for canceling the increased potential difference, and a PWM half cycle for preventing a current change.

Figure 4:
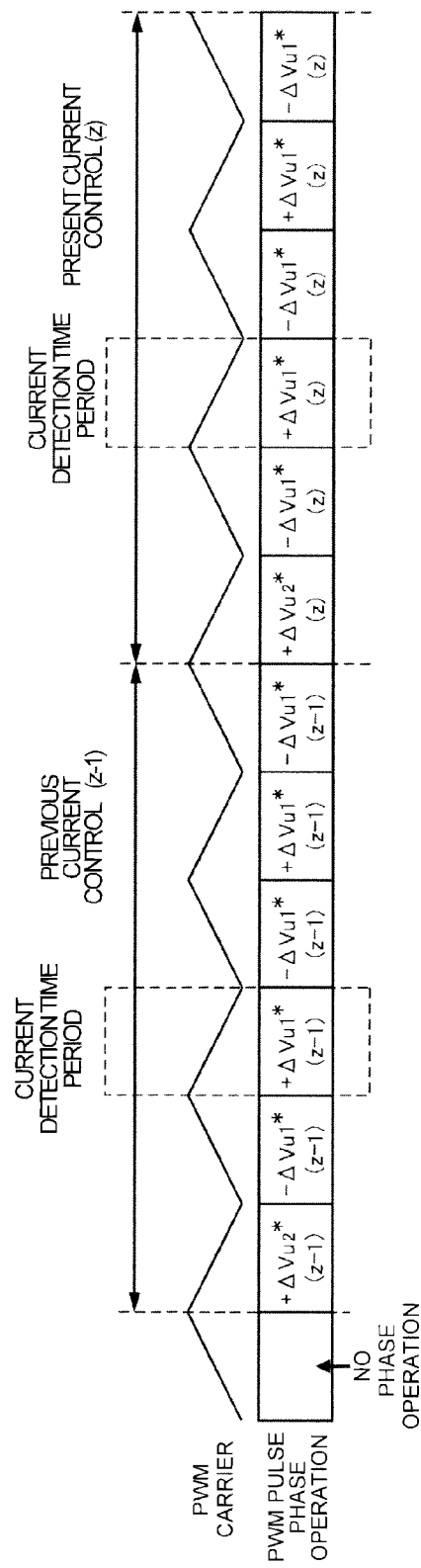
FIG. 4 illustrates a current control cycle and a PWM pulse phase operation timing according to the first embodiment.

FIG. 4 illustrates a current control cycle and a PWM pulse phase operation timing.

The current control cycle corresponds to three PWM cycles. The PWM half cycle for preventing a current change is set to the same PWM half cycle as a timing when the first instruction voltage value as a current control output is updated. Further, the next PWM half cycle is set as the PWM half cycle for canceling an increased potential difference. Further, the next PWM half cycle is set as the PWM half cycle for increasing a potential difference. After that, the PWM half cycle for canceling an increased potential difference, and the PWM half cycle for increasing the potential difference are alternately set. A current detection period is set to the first PWM half cycle for increasing a voltage difference.

The second instruction voltage values Vu2*, Vv2*, and Vw2* of the respective phases are set by the following equations (2) to (5).
(PWM Half Cycle for Preventing Current Change)

$$Vu2^*=Vu1^*+\Delta Vu2^*(z)$$

$$Vv2^*=Vv1^*+\Delta Vv2^*(z)$$

$$Vw2^*=Vw1^*+\Delta Vw2^*(z) \qquad (2)$$

(PWM Half Cycle for Increasing Voltage Difference)

$$Vu2^*=Vu1^*+\Delta Vu1^*(z)$$

$$Vv2^*=Vv1^*+\Delta Vv1^*(z)$$

$$Vw2^*=Vw1^*+\Delta Vw1^*(z) \qquad (3)$$

(PWM Half Cycle for Canceling Increased Voltage Difference)

$$Vu2^*=Vu1^*-\Delta Vu1^*(z)$$

$$Vv2^*=Vv1^*-\Delta Vv1^*(z)$$

$$Vw2^*=Vw1^*-\Delta Vw1^*(z) \qquad (4)$$

The equation (2) can be also expressed by the following equation (5) with use of the above-described equation (1).

$$Vu2^*=Vu1^*+(\Delta Vu1^*(z)+\Delta Vu1^*(z-1))/2$$

$$Vv2^*=Vv1^*+(\Delta Vv1^*(z)+\Delta Vv1^*(z-1))/2$$

$$Vw2^*=Vw1^*+(\Delta Vw1^*(z)+\Delta Vw1^*(z-1))/2 \qquad (5)$$

The correction with use of the second PWM pulse phase operation amounts ΔVu2*(z), ΔVv2*(z), and ΔVw2*(z) is performed when a running speed of the vehicle is a predetermined value or lower, or when a steering torque is a predetermined value or smaller. When a running speed of the vehicle is low, a running noise is relatively small, whereby a noise of the motor control system has a large influence. The correction with use of the second PWM pulse phase operation amounts ΔVu2*(z), ΔVv2*(z), and ΔVw2*(z) (phase switching subsequent correction amount adjustment control) can reduce the noise of the motor control system when the running noise is small. Further, when a steering torque is relatively small, i.e., in a state close to a steering maintaining state when the electric motor 6 stops working or rotates at an extremely low speed, pulse shift phase switching control is frequently performed. Therefore, the phase switching subsequent correction amount adjustment control is performed in this state, whereby an influence can be further reduced on current feedback control.

[Function]

A function when a correction is made based on the first PWM pulse phase operation amounts ΔVu1*(z), ΔVv1*(z), and ΔVw1*(z), and a function when a correction is made based on the first PWM pulse phase operation amounts ΔVu1*(z), ΔVv1*(z), and ΔVw1*(z), and the second pulse phase operation amounts ΔVu2*(z), ΔVv2*(z), and ΔVw2*(z) will be described by comparing them.

Figure 5:
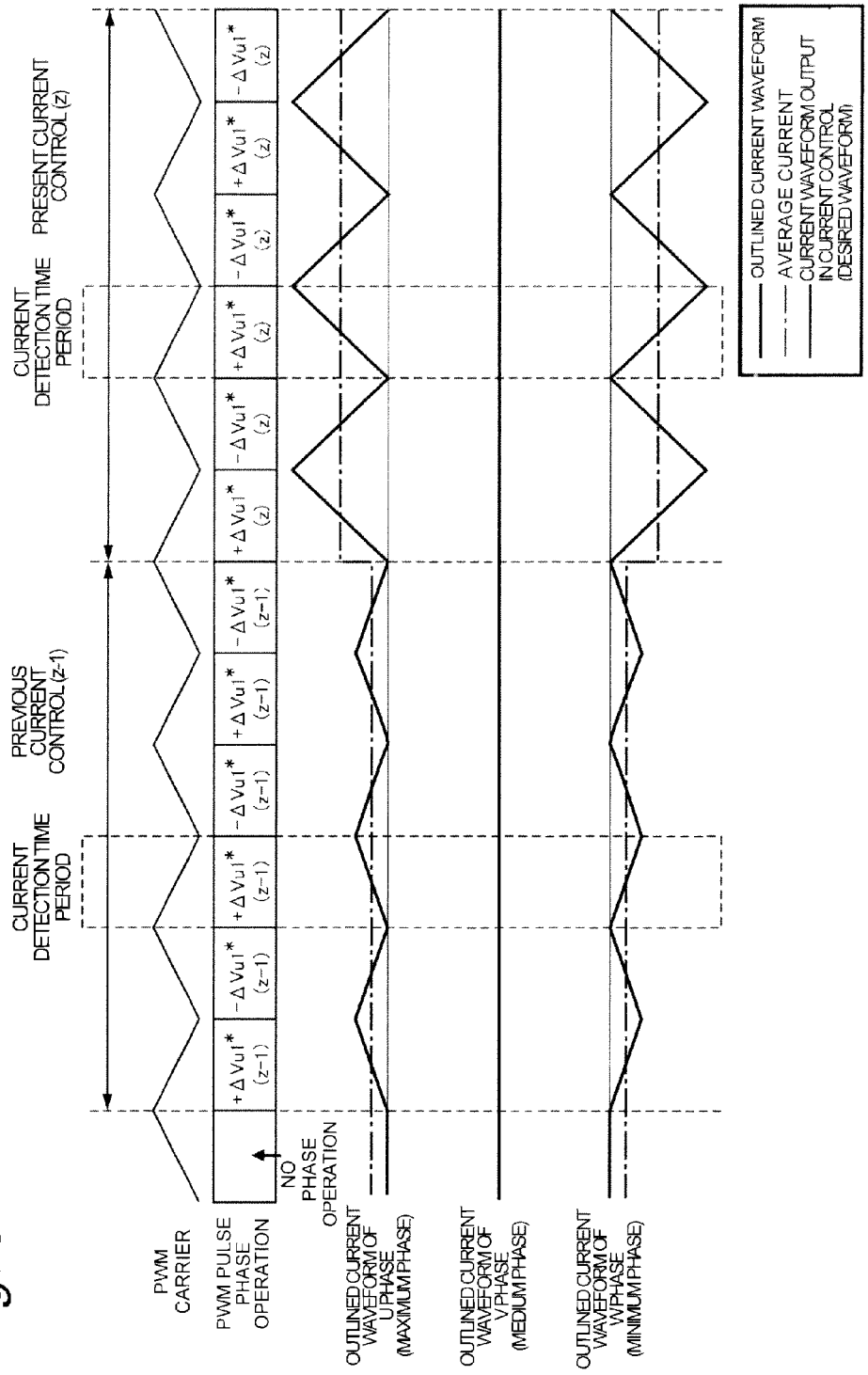
FIG. 5 illustrates outlined current waveforms of respective phases according to the first embodiment.
Figure 6:
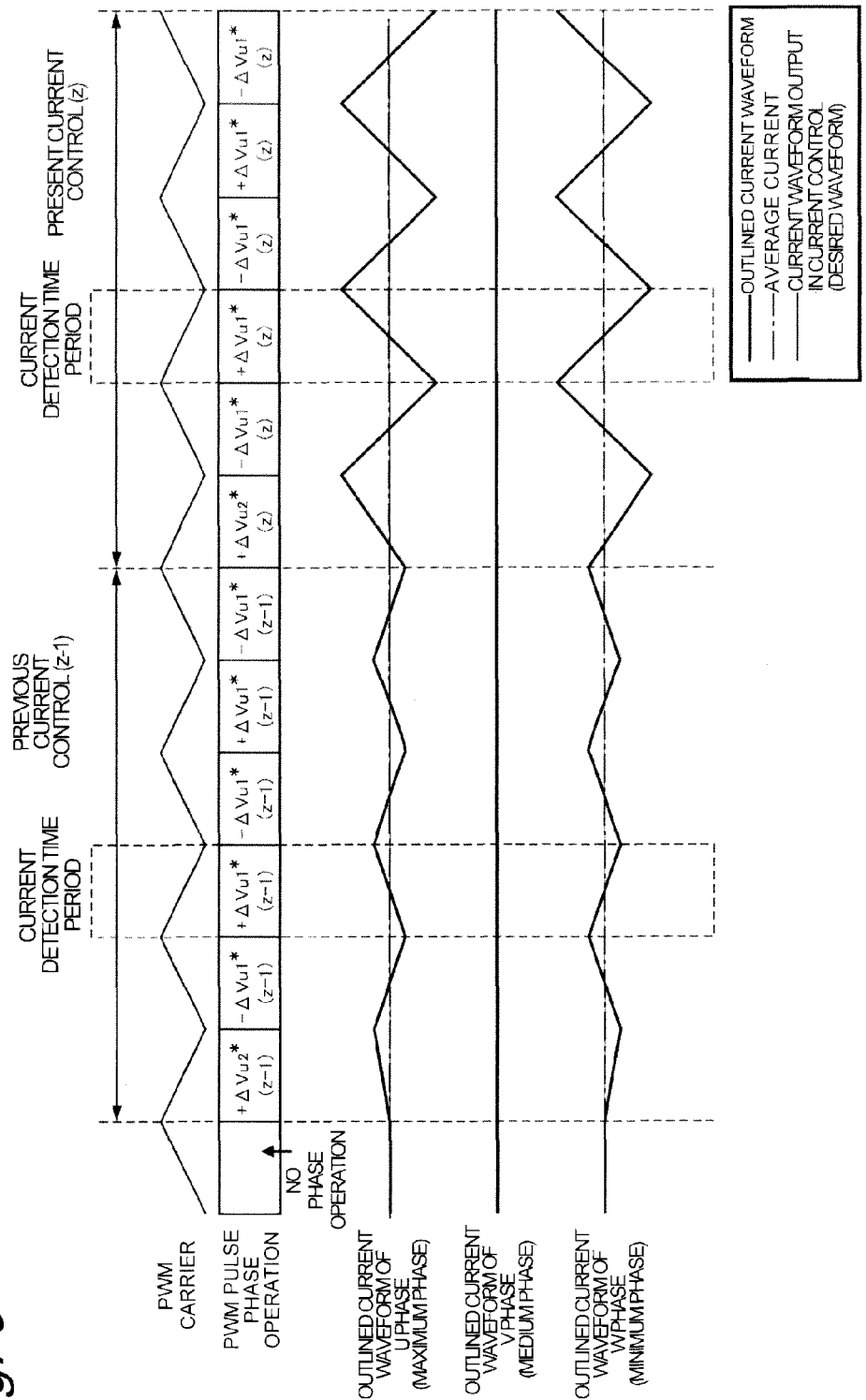
FIG. 6 illustrates outlined current waveforms of the respective phases according to the first embodiment.

FIG. 5 illustrates outlined waveforms of currents of the respective phases controlled by the second instruction voltage values Vu2*, Vv2*, and Vw2* corrected only based on the first PWM pulse phase operation amounts ΔVu1*(z), ΔVv1*(z), and ΔVw1*(z). FIG. 6 illustrates outlined waveforms of currents of the respective phases controlled by the second instruction voltage values Vu2*, Vv2*, and Vw2* corrected based on the first PWM pulse phase operation amounts ΔVu1*(z), ΔVv1*(z), and ΔVw1*(z), and the second PWM pulse phase operation amounts ΔVu2*(z), ΔVv2*(z), and ΔVw2*(z).

In FIGS. 5 and 6, the maximum phase, the middle phase, and the minimum phase are the u phase, the v phase, and the w phase in the previous control cycle (z−1) and the present control cycle (z) current control, respectively. However, the voltages of the respective phases are changed in the following manner in the present current control cycle (z) compared to the previous current control cycle (z−1).

$$Vu1^*(z-1)>Vu1^*(z)$$

$$Vv1^*(z-1)=Vv1^*(z)$$

$$Vw1^*(z-1)<Vw1^*(z)$$

In other words, in both the previous current control cycle (z−1) and the present current control cycle (z), the maximum phase, the middle phase, and the minimum phase are unchangingly the u phase, the v phase, and the w phase, respectively. However, the PWM pulse phase operation amount is changed due to a change in the voltage of each phase.

The correction based on the first PWM pulse phase operation amounts $\Delta Vu1^*(z)$, $\Delta Vv1^*(z)$, and $\Delta Vw1^*(z)$ may result in an average current of the current having an electric ripple that is different from a desired current value (a current change) as illustrated in FIG. 5, thereby deteriorating current controllability.

On the other hand, the correction based on the first PWM pulse phase operation amounts $\Delta Vu1^*(z)$, $\Delta Vv1^*(z)$, and $\Delta Vw1^*(z)$, and the second PWM pulse phase operation amounts $\Delta Vu2^*(z)$, $\Delta Vv2^*(z)$, and $\Delta Vw2^*(z)$ results in an average current of the current having an electric ripple that matches a desired current value as illustrated in FIG. 6, thereby improving current controllability.

This is because, in the second instruction voltage values Vu2*, Vv2*, and Vw2*, the second pulse PWM pulse phase operation amounts $\Delta Vu^*2(z)$, $\Delta Vv^*2(z)$, and $\Delta Vw^*2(z)$ are used as the PWM pulse phase operation amounts in the PWM half cycle for preventing a current change. Average values between the first PWM pulse phase operation amounts $\Delta Vu1^*(z)$, $\Delta Vv1^*(z)$, and $\Delta Vw^*1(z)$ in the present control cycle, and the first PWM pulse operation amounts $\Delta Vu1^*(z-1)$, $\Delta Vv1^*(z-1)$, and $\Delta Vw1^*(z-1)$ in the previous control cycle are set as the second PWM pulse phase operation amounts $\Delta Vu2^*(z)$, $\Delta Vv2^*(z)$, and $\Delta Vw2^*(z)$, as indicated by the equation (1). Therefore, the PWM phase operation amounts in the PWM half cycle for preventing a current change are smaller than the PWM phase operation amounts in the PWM half cycle for canceling an increased potential difference, thereby reducing a change in the average current.

Figure 7:
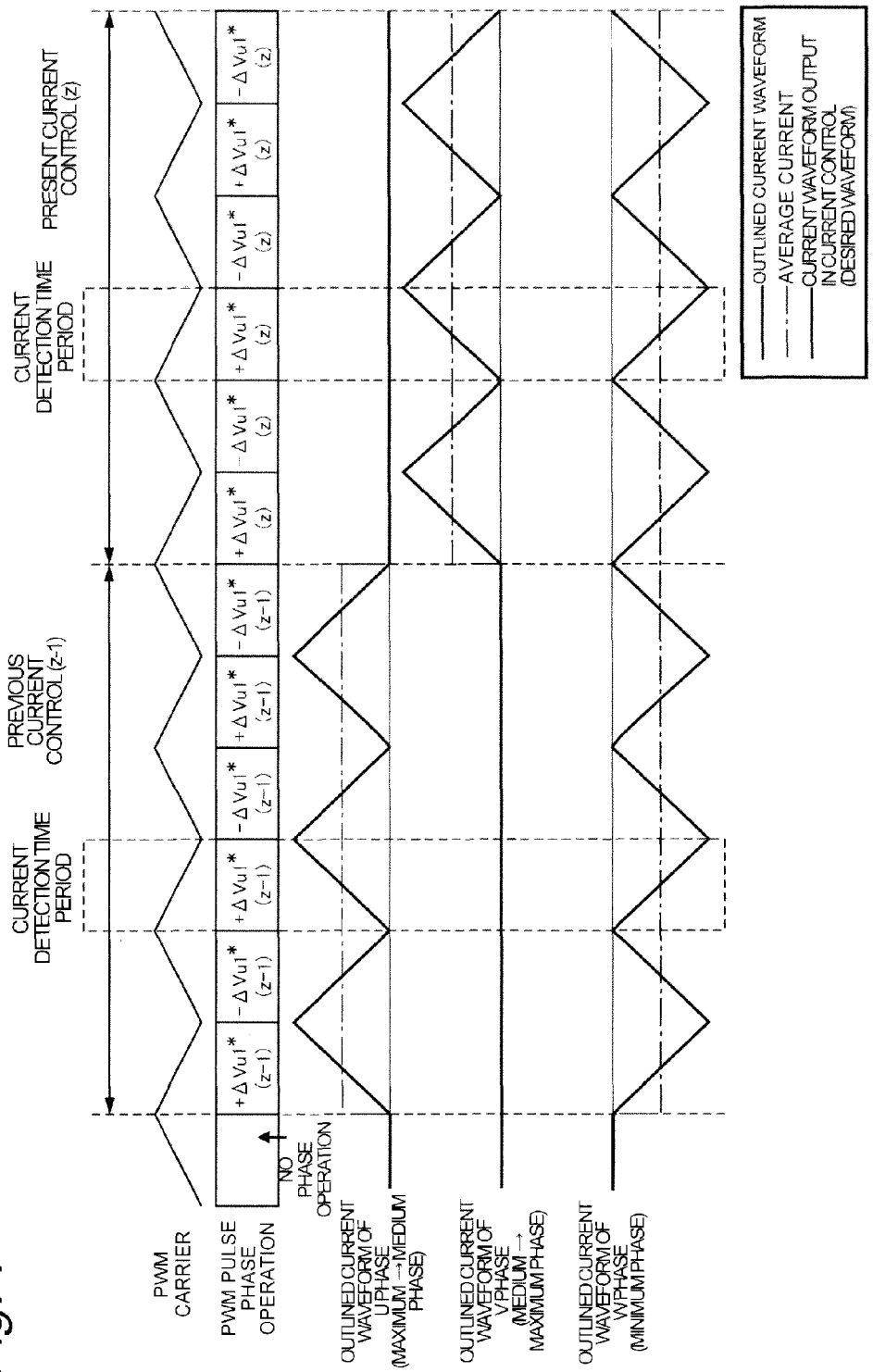
FIG. 7 illustrates outlined current waveforms of the respective phases according to the first embodiment.
Figure 8:
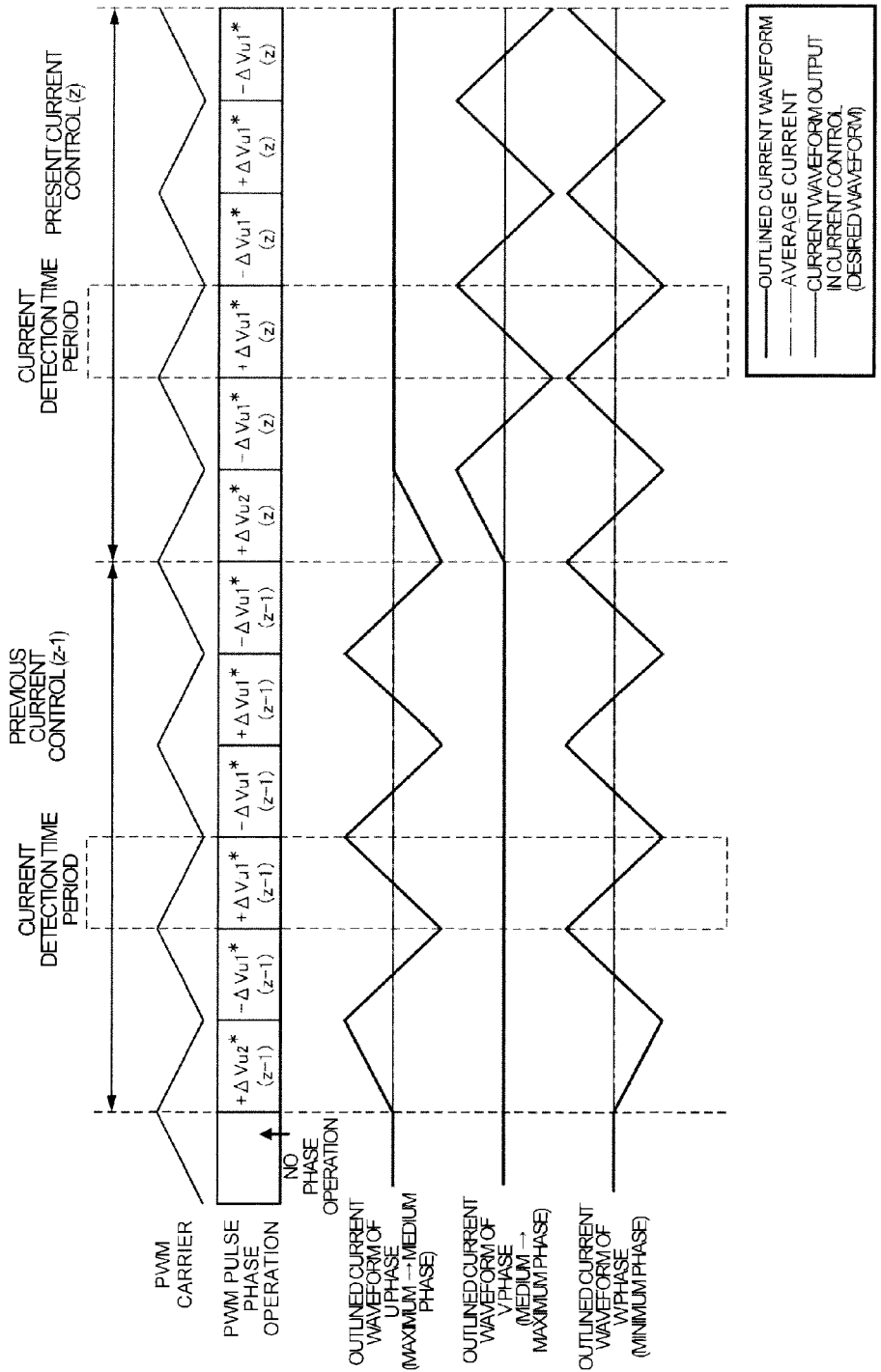
FIG. 8 illustrates outlined current waveforms of the respective phases according to the first embodiment.

The function will be further described based on another example. FIG. 7 illustrates outlined waveforms of currents of the respective phases controlled by the second instruction voltage values Vu2*, Vv2*, and Vw2* corrected only based on the first PWM pulse phase operation amounts $\Delta Vu1^*(z)$, $\Delta Vv1^*(z)$, and $\Delta Vw1^*(z)$. FIG. 8 illustrates outlined waveforms of currents of the respective phases controlled by the second instruction voltage values Vu2*, Vv2*, and Vw2* corrected based on the first PWM pulse phase operation amounts $\Delta Vu1^*(z)$, $\Delta Vv1^*(z)$, and $\Delta Vw1^*(z)$, and the second PWM pulse phase operation amounts $\Delta Vu2^*(z)$, $\Delta Vv2^*(z)$, and $\Delta Vw2^*(z)$.

In FIGS. 7 and 8, the maximum phase, the middle phase, and the minimum phase are the u phase, the v phase, and the w phase in the previous current control cycle (z−1), respectively. On the other hand, the maximum phase, the middle phase, and the minimum phase are the v phase, the u phase, and the w phase in the present current control cycle (z), respectively. Further, the voltages of the respective phases are changed in the following manner in the present current control cycle (z) compared to the previous current control (z−1).

$$Vu1^*(z-1) > Vu1^*(z)$$

$$Vv1^*(z-1) < Vv1^*(z)$$

$$Vw1^*(z-1) = Vw1^*(z)$$

In other words, the phase determination by the PWM pulse phase operation is switched between the previous current control cycle (z−1) and the present current control cycle (z). The maximum phase and the middle phase are the u phase and the v phase in the previous current control cycle (z−1), respectively. However, the maximum phase and the middle phase are the v phase and the u phase in the present current control cycle (z). In this manner, the determination by the PWM phase operation is switched at cross-points of the instruction voltage values, and the PWM pulse phase operation amounts are changed suddenly. The correction based on the first PWM pulse phase operation amounts $\Delta Vu1^*(z)$, $\Delta Vv1^*(z)$, and $\Delta Vw1^*(z)$ may result in an average current of the current having an electric ripple that is different from a desired current value (a current change) as illustrated in FIG. 7, thereby deteriorating current controllability.

On the other hand, the correction based on the first PWM pulse phase operation amounts $\Delta Vu1^*(z)$, $\Delta Vv1^*(z)$, and $\Delta Vw1^*(z)$, and the second PWM pulse phase operation amounts $\Delta Vu2^*(z)$, $\Delta Vv2^*(z)$, and $\Delta Vw2^*(z)$ results in an average current of the current having an electric ripple that matches a desired current value as illustrated in FIG. 8, thereby improving current controllability.

In FIG. 8, the first PWM pulse phase operation amounts $\Delta Vu1^*(z)$, $\Delta Vv1^*(z)$, and $\Delta Vw1^*(z)$ are maintained constant around the timing of switching the phase determination by the PWM pulse phase operation, but may be changeable.

[Problem with Current Detection by Single Shunt Resistance]

The method for detecting a current of each phase by providing a shunt resistance at each phase is replaced with a method for providing a single shunt resistance at the direct-current bus and detecting a current value of each phase from the direct-current bus current detected at this shunt resistance (single shunt current control).

The single shunt current control reproduces a current of each phase by detecting the instantaneous current passing through the direct-current bus based on a voltage difference (a time difference in a PWM pulse rise or decline) among the respective phases during a half PWM cycle (a rise or a decline of the PWM triangular wave carrier signal). However, if the instruction voltage values of the respective phases output in the current control are close to one another, the voltage difference (the time difference in the PWM pulse rise or decline) among the respective phases cannot be large enough for the detection, making correct detection of the current difficult.

The above-described invention disclosed in the patent document 1 (Japanese Patent Application Public Disclosure NO. 2001-327173) monitors a voltage difference among the respective phases in PWM pulses generated based on the instruction voltage values output in the current control, and corrects the instruction voltage values so as to increase the voltage difference in the half cycle of the PWM (triangular) carrier cycle so as to secure a minimum time required for the detection. In this manner, this invention ensures that the current can be detected even when instruction voltage values of the respective phases output in the current control are close to one another.

Further, the instruction voltage values are corrected in a direction for canceling out the increase in the next half cycle. In this manner, the voltages in the PWM half cycle are unchanged between before the correction and after the correction.

In other words, the invention disclosed in the patent document 1 performs an operation for shifting the phases of maximum and minimum PWM pulses in a direction for securing at least the detection time from the PWM switching timing of the middle phase (a PWM pulse phase operation or a pulse shift). As a result, it is possible to further reliably detect the direct-current bus current from the increased voltage difference during the current detection.

Further, according to the method disclosed in the patent document 1, a single PWM carrier cycle is set as a single voltage correction cycle. Therefore, a current instantaneously increases by the increased voltage difference during the above-described single voltage correction cycle, and the current instantaneously reduces by a degree corresponding to canceling out the increased voltage difference. Therefore, a current ripple is generated on the current acquired from the voltage instruction output in the current control.

If the current detection period is set in the first half cycle, the first half cycle serves as the voltage correction period for increasing a voltage difference, and the second half cycle serves as the voltage correction period for canceling out the increase of the voltage difference. The current of the maximum phase has such a current waveform that the current increases from the desired current value in the first half cycle, and then the current reduces to return to the desired current value in the second half cycle. The current of the minimum phase has such a current waveform that the current reduces from the desired current value in the first half cycle, and then the current increases to return to the desired current in the second half cycle.

If the current detection period is set in the second half cycle, the first half cycle serves as the voltage correction period for canceling out the increase in the voltage difference, and the second half cycle serves as the voltage correction period for increasing the voltage difference. The current of the maximum phase has such a current waveform that the current reduces from the desired current value in the first half cycle, and then the current increases to return to the desired current value in the second half cycle. The current of the minimum phase has such a waveform that that the current increases from the desired current value in the first half cycle, and then the current reduces to return to the desired current value in the second half cycle.

The size of the current ripple is determined based on the corrected voltage amount and the direct-current voltage amount, and an electric characteristic of the motor. More specifically, if the PWM phase operation amount (=time tps) is sufficiently small relative to a current response speed (a time constant=L/R) determined based on the electric characteristic of the motor, an increase amount or a reduction amount of the instantaneous current by the correction voltage can be approximated by the following equation (6).

$$\Delta I = 1/L \times Vdc \times tps + I_0 \quad (6)$$

In this equation, $\Delta I$ represents the instantaneous current change by the voltage correction, L represents a motor inductance, Vdc represents the direct-current voltage, tps represents the PWM phase operation amount, and $I_0$ represents an initial current value of a current amount immediately before the correction.

In other words, the average value of the current ripple affects (is added to) the desired current value as a change (a current change). If the instruction voltage value and the correction voltage value output in the current control are maintained constant for a sufficient time, the current change is settled to the desired current value acquired from the instruction voltage value by the motor electric characteristic (however, this does not mean that the current ripple is eliminated, and the current ripple continues to be generated around the desired current). However, the cycle in which the instruction voltage value is updated, i.e., the current control cycle is sufficiently short compared to a current settlement time according to the current response speed, which is the motor electric characteristic. Therefore, in the normal current control, the current control is performed without acquiring the desired current for the instruction voltage value under the influence of the current change, thereby deteriorating the controllability.

Solution

The present technique actively eliminates the above-described current change without waiting for a settlement of this change by adjusting the corrected voltage amount in the PWM half cycle. The present technique is configured in the following manner to realize it.

A current detection circuit is provided upstream or downstream of the direct-current bus of the bridge circuit. The current detection circuit detects the current passing through the direct-current bus, which is generated due to the voltage difference among the three phases during the PWM carrier half-cycle. The above-described current detection period is set in a first half cycle or a second half cycle of the PWM carrier cycle. Further, the current control cycle is set to an integral multiple (k>2) of the PWM half cycle. Further, a first voltage instruction correction unit is provided. The first voltage correction unit adds a predetermined voltage to the three-phase voltage instruction values output from the current control unit in a direction for increasing a voltage difference among the respective phases during the above-described current detection period, assuming that a predetermined time is a minimum time required to detect the instantaneous current passing through the current detection circuit provided at the voltage direct-current bus, and a predetermined voltage is a voltage difference among the respective phases to secure the predetermined time. Further, the first voltage instruction correction unit has a function of correcting a voltage instruction in a direction for canceling out a voltage instruction correction added to the predetermined voltage in the PWM half cycle other than the above-described current detection.

Further, the above-described first voltage instruction correction unit includes at least one second voltage instruction correction unit for preventing the above-described current change before the current detection period during the above-described current control cycle, for each PWM half cycle. The second voltage instruction correction unit adjusts the voltage instruction correction amount and adds/subtracts it to/from the voltage instruction value output in the current control in such a manner that the above-described initial current value $I_0$ immediately before the current detection period becomes equal to a current value after a current reduction when a half of the above-described voltage instruction correction is introduced once in the PWM half cycle immediately before the current detection period from a state in which the above-described first voltage instruction correction amount remains zero, so as to actively eliminate the above-described current change. As the current change amount by the voltage instruction correction is expressed by the equation (6), the current change amount is also affected by a current state immediately before the voltage correction.

In other words, the current change due to the present voltage correction is also affected by the state of the previous voltage correction. Therefore, a total amount of the voltage instruction correction amount for preventing a current change, which should be supplied during the single current control cycle and before the current detection period, is calculated as a half of a difference between the voltage correction amount of the first voltage instruction correction unit, which is calculated in the present current control, and the voltage correction amount of the first voltage instruction correction unit, which is calculated in the previous current control, for each phase.

$$Vucmp_{total} = -(Vucmp_1(z) - Vucmp_1(z-1))/2 \quad (7)$$

Vucmp$_{total}$: TOTAL AMOUNT OF VOLTAGE INSTRUCTION CORRECTION FOR PREVENTING CURRENT CHANGE FOR U PHASE Vucmp$_1$(z): FIRST VOLTAGE CORRECTION AMOUNT FOR U PHASE DURING PRESENT CURRENT CONTROL Vucmp$_1$(z−1): FIRST VOLTAGE CORRECTION AMOUNT FOR U PHASE DURING PREVIOUS CURRENT CONTROL (This amount for each of the V phase and the W phase is also expressed by a similar equation.)

Further, the direction of the voltage instruction correction amount for preventing the current change is the same as the direction of the above-described first voltage correction. (If the direction of the first voltage correction is a direction for increasing the voltage difference, Vucmp$_1$(z) has a positive value, and at this time, Vucmp$_{total}$ has a positive value as the direction of the voltage instruction correction for preventing the current change. Meanwhile, in the equation (7), Vucmp$_{total}$<=0.)

Further, Vucmp$_{total}$ is a total amount of the voltage instruction correction amount for preventing the current change as described above, and therefore may be divided for correction during the current control cycle and by the current detection period. Further, Vucmp$_{total}$ may be assumed as a correction optimum value, and a total amount of the actually provided correction amount may be within a range of 0>=Vucmp$_{total}$.

Therefore, it is possible to prevent a current change due to the PWM phase operation before the current detection, and acquire the desired current according to the voltage instruction output in the current control, thereby improving current controllability. Further, it is possible to prevent the maximum phase, the middle phase, and the minimum phase of the three-phase voltage instruction from being frequently switched due to the improvement of current controllability at the voltage instruction cross-point for switching the maximum phase, the middle phase, and the minimum phase of the three-phase voltage instruction, where the voltage correction value is suddenly changed especially.

Therefore, it is possible to reduce an acoustic noise (an electromagnetic acoustic noise) generated at the voltage cross-point where the maximum/middle/minimum determination of the voltage instruction is switched, in an EPS steering state other than a state in which a driver does not grip the steering wheel.

Assuming that a predetermined voltage is the voltage correction amount at the first voltage instruction correction unit, the voltage correction amount is changed for each phase only at the timing when the maximum/middle/minimum determination of the voltage instruction output in the current control is switched. A second voltage correction is performed at a timing during one current control cycle after a result of the maximum/middle/minimum determination is switched (the voltage instruction cross-point), and during a PWM half cycle of a first voltage instruction correction in the present current control cycle so as not to be affected by the motor electric characteristic. Therefore, a second voltage correction amount for each phase can be expressed by the following equation (8) by adding the first voltage correction amount and the total voltage correction amount (Vucmp$_{total}$) for preventing a current change at the above-described timing.

$$Vucmp_2 = Vucmp_1 x_1 + Vucmp_{total} \quad (8)$$
$$= Vucmp_1 x_1 - (Vucmp_1 x_1 - Vucmp_1 x_0)/2$$
$$= (Vucmp_1 x_1 + Vucmp_1 x_0)/2$$

Vucmp$_2$: SECOND VOLTAGE CORRECTION AMOUNT FOR U PHASE

Vucmp$_1$x$_1$: FIRST VOLTAGE CORRECTION AMOUNT AFTER VOLTAGE INSTRUCTION CROSS-POINT FOR U PHASE Vucmp$_1$x$_0$: FIRST VOLTAGE CORRECTION AMOUNT BEFORE VOLTAGE INSTRUCTION CROSS-POINT FOR U PHASE (The correction amount for each of the V and W phases is also expressed by a similar equation.)

Further, the direction of the second voltage correction Vucmp$_2$ is the same as the direction of the first voltage correction. Therefore, although it is necessary to prepare a determination unit for determining whether the maximum/middle/minimum determination is switched, the equation (7) does not have to be calculated constantly so that a calculation load can be reduced.

Further, if the voltage correction amount is changed from the predetermined voltage to such a variable amount that a voltage difference after the correction matches the predetermined voltage at the first voltage instruction correction unit, the timing when the voltage correction amount for each phase is changed becomes each current control cycle in which the current control output is changed. Further, the timing when the second voltage correction is performed is set to the PWM half cycle corresponding to the first voltage instruction correction during the present current control cycle so as not to be affected by the motor electric characteristic. Therefore, the second voltage correction amount for each phase can be expressed by the following equation (9) by adding the first voltage correction amount and the total voltage correction amount (Vucmp$_{total}$) for preventing a current change at the above-described timing.

$$Vucmp_2 = Vucmp_1(z) + Vucmp_{total} \quad (9)$$
$$= Vucmp_1(z) - (Vucmp_1(z) - Vucmp_1(z-1))/2$$
$$= (Vucmp_1(z) + Vucmp_1(z-1))/2$$

Vucmp$_2$: SECOND VOLTAGE CORRECTION AMOUNT FOR U PHASE

Vucmp$_1$(z): FIRST VOLTAGE CORRECTION AMOUNT FOR U PHASE DURING PRESENT CURRENT CONTROL Vucmp$_1$(z−1): FIRST VOLTAGE CORRECTION AMOUNT FOR U PHASE DURING PREVIOUS CURRENT CONTROL (The correction amount for each of the V and W phases is also expressed by a similar equation.)

Further, the direction of the second voltage correction is the same as the direction of the first voltage correction. Therefore, the PWM phase operation amount can be minimized, whereby the allowable range of the PWM phase operation can be expanded while keeping the limited PWM output range. Therefore, the direct-current bus current can be detected highly accurately in a further wider region.

The timing when the second voltage correction is performed is set to a PWM half cycle, which is the same timing as the timing when the current control output is updated, and the timing when the current is detected is set to a PWM half cycle immediately after that. In other words, the phase current calculation unit 16 estimates the current values of the respective phases using the direct-current bus current detected in a next PWM half cycle of a PWM half cycle in which the pulse shift phase switching control is performed, among respective PWM half cycles in PWM half cycles in which the PWM control unit 12 performs PWM control.

Therefore, in addition to the above-described functions, the second voltage correction can be performed at an earliest timing after the current control output is updated, and therefore a shortest current detection period can be set.

Therefore, the current control cycle can be set as one and a half PWM cycle or longer so that a shortest current control cycle can be realized to achieve fine current control. (The first half of the first cycle is the second voltage correction period, the second half of the first cycle is the current detection period, and the first half of the second PWM cycle is the current control output calculation period after the current detection. The current control output calculation period is not set in the current detection period due to a limitation from the direct-current bus current detection method.)

Effects

Effects of the first embodiment will be described.

(1) The motor control unit (a motor control apparatus) 8 drives and controls the electric motor 6 (a three-phase brushless motor) that rotationally drives the worm shaft 37 (a driving shaft) of the apparatus installed on the vehicle. The motor control unit 8 includes:

the instruction current value calculation unit 15 that calculates the instruction current values Id* and Iq* to be supplied to the electric motor 6 based on a driving state of the vehicle;

the PWM control unit 12 that outputs the PWM duty signal to each of the u, v, and w phases of the electric motor 6 according to the instruction current values Id* and Iq*;

the three-phase bridge circuit 4 that is constituted by the switching element 3 to be driven and controlled by the PWM duty signal, and drives and controls the electric motor 6;

the current detection unit 9 (a current sensor) that is provided at the direct-current bus 13 connected to the three-phase bridge circuit 4, and detects the direct-current bus current passing through the direct-current bus 13;

the phase current calculation unit 16 (a phase current calculation unit) that estimates the current values of the respective u, v, and w phases based on the direct-current bus current when the PWM duty signal of the maximum phase corresponding to a longest power supply time is turned on and the duty signals of the minimum phase corresponding to a shortest power supply time and the middle phase are turned off among the PWM duty signals to the respective u, v, and w phases of the electric motor 6, and the direct-current bus current when the PWM duty signal of the maximum phase is turned on and the PWM duty signal of the middle phase is turned on among the PWM duty signals to the respective u, v, and w phases of the electric motor 6;

the current feedback circuit 14 (the current control unit 10) that performs a feedback correction on the instruction current values based on the current values of the respective u, v, and w phases estimated by the phase current calculation unit 16;

the instruction voltage value correction unit 11 (a pulse shift control circuit) that performs pulse shift control of correcting the phase of the PWM duty signal of the maximum or the middle phase in such a manner that a difference between the switching timings of the PWM duty signals of the maximum and middle phases can reach or exceed the second predetermined value larger than the first predetermined value when the difference between the switching timing of the PWM duty signal of the maximum phase and the switching timing of the PWM duty signal of the middle phase at the timing of the direct-current bus current detection by the phase current calculation unit 16 falls below the first predetermined value, and correcting the phase of the PWM duty signal of the middle or the minimum phase in such a manner that a difference between the switching timings of the PWM duty signals of the middle and minimum phases can reach or exceed the second predetermined value when the difference between the switching timing of the PWM duty signal of the middle phase and the switching timing of the PWM duty signal of the minimum phase at the timing of the direct-current bus current detection by the phase current calculation unit falls below the first predetermined value; and the second PWM pulse phase operation amount calculation unit 11c that is provided at the instruction voltage value correction unit 11, and sets the correction amount $\Delta Vu2^*(z)$, $\Delta Vv2^*(z)$, $\Delta Vw2^*(z)$ for the phase of the PWM duty signal corresponding to the switching timing at a time that is not the timing of the direct-current bus current detection by the phase current calculation unit to a smaller amount than the correction amount $\Delta Vu1^*(z)$, $\Delta Vv1^*(z)$, $\Delta Vw1^*(z)$ for the phase of the PWM duty signal, when the correction amount for the phase of the PWM duty signal is changed.

After the correction amount for the phase of the PWM duty signal is changed, the power supply amount increases due to the phase correction, affecting the current feedback control. When the correction amount for the phase of the PWM duty signal is changed, the present embodiment sets the correction amount for the phase of the PWM duty signal corresponding to the switching timing at a time that is not the timing of the direct-current bus current detection by the phase current calculation unit to a smaller amount than the correction amount for the phase of the PWM duty signal, thereby reducing this influence.

(2) The power steering apparatus 30 includes:

the steering mechanism 32 that turns the wheel 42 to be steered according to a steering operation performed on the steering wheel 31;

the electric motor 6 that provides a steering force to the steering mechanism 32; and the motor control unit 8 (the control apparatus) that drives and controls the electric motor 6.

The motor control unit 8 includes:

the instruction current value calculation unit 15 that calculates the instruction current values Id* and Iq* to be supplied to the electric motor 6 based on a driving state of the vehicle;

the PWM control unit 12 that outputs the PWM duty signal to each of the u, v, and w phases of the electric motor 6 according to the instruction current values Id* and Iq*;

the three-phase bridge circuit 4 that is constituted by the switching element 3 to be driven and controlled by the PWM duty signal, and drives and controls the electric motor 6;

the current detection unit 9 (a current sensor) that is provided at the direct-current bus 13 connected to the three-phase bridge circuit 4, and detects the direct-current bus current passing through the direct-current bus 13;

the phase current calculation unit 16 (a phase current calculation unit) that estimates the current values of the respective u, v, and w phases based on the direct-current bus current when the PWM duty signal of the maximum phase corresponding to a longest power supply time is turned on and the duty signals of the minimum phase corresponding to a shortest power supply time and the middle phase are turned off among the PWM duty signals to the respective u, v, and w phases of the electric motor 6, and the direct-current bus current when the PWM duty signal of the maximum phase is turned on and the PWM duty signal of the middle phase is turned on among the PWM duty signals to the respective u, v, and w phases of the electric motor 6;

the current feedback circuit 14 (the current control unit 10) that performs a feedback correction on the instruction current values based on the current values of the respective u, v, and w phases estimated by the phase current calculation unit 16;

the instruction voltage value correction unit 11 (a pulse shift control circuit) that performs pulse shift control of correcting the phase of the PWM duty signal of the maximum or the middle phase in such a manner that a difference between the switching timings of the PWM duty signals of the maximum and middle phases can reach or exceed the second predetermined value larger than the first predetermined value when the difference between the switching timing of the PWM duty signal of the maximum phase and the switching timing of the PWM duty signal of the middle phase at the timing of the direct-current bus current detection by the phase current calculation unit 16 falls below the first predetermined value, and correcting the phase of the PWM duty signal of the middle or the minimum phase in such a manner that a difference between the switching timings of the PWM duty signals of the middle and minimum phases can reach or exceed the second predetermined value when the difference between the switching timing of the PWM duty signal of the middle phase and the switching timing of the PWM duty signal of the minimum phase at the timing of the direct-current bus current detection by the phase current calculation unit falls below the first predetermined value; and the second PWM pulse phase operation amount calculation unit 11c that is provided at the instruction voltage value correction unit 11, and sets the correction amount $\Delta Vu2^*(z)$, $\Delta Vv2^*(z)$, $\Delta Vw2^*(z)$ for the phase of the PWM duty signal corresponding to the switching timing at a time that is not the timing of the direct-current bus current detection by the phase current calculation unit to a smaller amount than the correction amount $\Delta Vu1^*(z)$, $\Delta Vv1^*(z)$, $\Delta Vw1^*(z)$ for the phase of the PWM duty signal, when the correction amount for the phase of the PWM duty signal is changed.

After the correction amount for the phase of the PWM duty signal is changed, the power supply amount increases due to the phase correction, affecting the current feedback control. When the correction amount for the phase of the PWM duty signal is changed, the present embodiment sets the correction amount for the phase of the PWM duty signal corresponding to the switching timing at a time that is not the timing of the direct-current bus current detection by the phase current calculation unit to a smaller amount than the correction amount for the phase of the PWM duty signal, thereby reducing this influence.

(3) The motor control unit (the motor control apparatus) 8 drives and controls the electric motor 6 (the three-phase brushless motor) that rotationally drives the worm shaft 37 (a driving shaft) of the apparatus installed on the vehicle. The motor control unit 8 includes:

the instruction current value calculation unit 15 that calculates the instruction current values Id* and Iq* to be supplied to the electric motor 6 based on a driving state of the vehicle;

the PWM control unit 12 that outputs the PWM duty signal to each of the u, v, and w phases of the electric motor 6 according to the instruction current values Id* and Iq*;

the three-phase bridge circuit 4 that is constituted by the switching element 3 to be driven and controlled by the PWM duty signal, and drives and controls the electric motor 6;

the current detection unit 9 (a current sensor) that is provided at the direct-current bus 13 connected to the three-phase bridge circuit 4, and detects the direct-current bus current passing through the direct-current bus 13;

the phase current calculation unit 16 (a phase current calculation unit) that estimates the current values of the respective u, v, and w phases based on the direct-current bus current when the PWM duty signal of the maximum phase corresponding to a longest power supply time is turned on and the duty signals of the minimum phase corresponding to a shortest power supply time and the middle phase are turned off among the PWM duty signals to the respective u, v, and w phases of the electric motor 6, and the direct-current bus current when the PWM duty signal of the maximum phase is turned on and the PWM duty signal of the middle phase is turned on among the PWM duty signals to the respective u, v, and w phases of the electric motor 6;

the current feedback circuit 14 (the current control unit 10) that performs a feedback correction on the instruction current values based on the current values of the respective u, v, and w phases estimated by the phase current calculation unit 16;

the instruction voltage value correction unit 11 (a pulse shift control circuit) that performs pulse shift control of correcting the phase of the PWM duty signal of the maximum or the middle phase in such a manner that a difference between the switching timings of the PWM duty signals of the maximum and middle phases can reach or exceed the second predetermined value larger than the first predetermined value when the difference between the switching timing of the PWM duty signal of the maximum phase and the switching timing of the PWM duty signal of the middle phase at the timing of the direct-current bus current detection by the phase current calculation unit 16 falls below the first predetermined value, and correcting the phase of the PWM duty signal of the middle or the minimum phase in such a manner that a difference between the switching timings of the PWM duty signals of the middle and minimum phases can reach or exceed the second predetermined value when the difference between the switching timing of the PWM duty signal of the middle phase and the switching timing of the PWM duty signal of the minimum phase at the timing of the direct-current bus current detection by the phase current calculation unit falls below the first predetermined value;

the maximum/middle/minimum voltage determination unit 11a (a pulse shift phase switching control unit) that is provided at the instruction voltage value correction unit 11, and controls pulse shift phase switching control for switching a control target phase on which pulse shift control is performed when the middle phase or the minimum phase is changed into the maximum phase, or the maximum phase or the middle phase is changed into the minimum phase according to a change in the instruction current values; and the second PWM pulse phase operation amount calculation unit 11c (a phase switching subsequent correction amount calculation unit) that is provided at the instruction voltage value correction unit 11, and sets the correction amount for the phase of the PWM duty signal corresponding to the switching timing at a time that is not the timing of the direct-current bus current detection by the current detection unit 9 to a smaller amount than the correction amount for the phase of the PWM duty signal at the time of switching the phase on which the pulse shift control is performed in the pulse shift phase switching control.

After the phase for which the phase of the PWM duty signal is corrected is switched, the power supply amount increases for the phase that is newly corrected, affecting the current feedback control. When the correction amount for the phase of the PWM duty signal is changed, the present embodiment sets the correction amount for the phase of the PWM duty signal corresponding to the switching timing at a time that is not the timing of the direct-current bus current detection by the phase current calculation unit to a smaller amount than the correction amount for the phase of the PWM duty signal, thereby reducing this influence.

Further, the second PWM pulse phase operation amount calculation unit 11c (the phase switching subsequent correction amount calculation unit) is provided at the instruction voltage value correction unit 11 (the pulse shift control circuit). The correction amount for the phase by the pulse shift control is determined in such a manner that the correction amount after the switching becomes smaller than the correction amount for the phase on which the pulse shift control is performed in the pulse shift phase switching control before the switching.

After the pulse shift phase switching, the power supply amount increases for the phase on which the pulse shift control is performed due to the pulse shift control, affecting the current feedback control. The present embodiment sets the correction amount for the phase by the pulse shift control in such a manner that the correction amount after the pulse shift phase switching becomes smaller than the correction amount before the pulse shift phase switching, thereby reducing this influence.

(4) The second PWM pulse phase operation amount calculation unit 11c sets the correction amount for the phase of the PWM duty signal corresponding to the switching timing at a time that is not the timing of the direct-current bus current detection by the phase current calculation unit 16 to 50% of the correction amount for the phase of the PWM duty signal corresponding to the switching timing at the timing of the direct-current bus current detection.

This can minimize a change in the power supply amount due to the pulse shift control at the current detection timing, thereby minimizing the influence on the current feedback control.

(5) The current detection unit 9 can detect the direct-current bus current in the next PWM half cycle of the PWM half cycle where the pulse shift phase switching control is performed among the respective PWM half cycles in the PWM half cycles in which the PWM control unit 12 performs the PWM control.

Therefore, the length of the current detection timing can be minimized, thereby increasing the current detection frequency accordingly to improve the controllability.

(6) The instruction voltage value correction unit 11 corrects both the phase that is a control target phase by the pulse shift phase switching control, and the phase that was a control target phase before the switching, and determines the correction amounts for the phases in such a manner that a total of the correction amounts for the both phases after the pulse shift phase switching control becomes substantially equal to a total of the correction amounts for the both phases before the pulse shift phase switching control.

The total of the correction amounts for the phases by the pulse shift control is substantially the same between before and after the switching, therefore simplifying the control.

(7) The instruction voltage value correction unit 11 corrects both the phase that is a control target phase by the pulse shift phase switching control, and the phase that was a control target phase before the switching, and determines the correction amounts for the phases in such a manner that a total of the correction amounts for the both phases after the pulse shift phase switching control becomes different from a total of the correction amounts for the both phases before the pulse shift phase switching control.

The correction amount for the phase is variably adjusted according to a change in the driving state of the vehicle and the like, thereby realizing further appropriate pulse shift control.

(8) The instruction voltage value correction unit 11 determines the correction amounts for the phases in such a manner that a total of the correction amounts for the both phases after the pulse shift phase switching control becomes smaller than a total of the correction amounts for the both phases before the pulse shift phase switching control, when a load on the electric motor 6 or the rotational speed of the electric motor 6 increases.

When a load on the electric motor 6 or the rotational speed of the electric motor 6 increases, the noise of the electric motor 6 is mixed with another noise, whereby the driver rarely feels uncomfortable. On the other hand, when a load on the electric motor 6 or the rotational speed of the electric motor 6 is small or low, the noise of the electric motor 6 is relatively loud, whereby the driver easily feels uncomfortable. By the above-described control, the noise of the electric motor 6 felt by the driver due to the control can be reduced.

(9) The rotational speed is calculated based on the information of the rotator angular sensor 7 (a rotational position sensor) that detects the rotational position of the rotor of the electric motor 6.

Therefore, it is unnecessary to provide an additional rotational sensor.

(10) The power steering apparatus 30 includes:

the steering mechanism 32 that turns the wheel 42 to be steered according to a steering operation performed on the steering wheel 31;

the electric motor 6 that provides a steering force to the steering mechanism 32; and the motor control unit 8 (the control apparatus) that drives and controls the electric motor 6.

The motor control unit 8 includes:

the instruction current value calculation unit 15 that calculates the instruction current values Id* and Iq* to be supplied to the electric motor 6 based on a driving state of the vehicle;

the PWM control unit 12 that outputs the PWM duty signal to each of the u, v, and w phases of the electric motor 6 according to the instruction current values Id* and Iq*;

the three-phase bridge circuit 4 that is constituted by the switching element 3 to be driven and controlled by the PWM duty signal, and drives and controls the electric motor 6;

the current detection unit 9 that is provided at the direct-current bus 13 connected to the three-phase bridge circuit 4, and detects the direct-current bus current passing through the direct-current bus 13;

the phase current calculation unit 16 that estimates the current values of the respective u, v, and w phases based on the direct-current bus current when the PWM duty signal of the maximum phase corresponding to a longest power supply time is turned on and the duty signals of the minimum phase corresponding to a shortest power supply time and the middle phase are turned off among the PWM duty signals to the respective u, v, and w phases of the electric motor 6, and the direct-current bus current when the PWM duty signal of the maximum phase is turned on and the PWM duty signal of the middle phase is turned on among the PWM duty signals to the respective u, v, and w phases of the electric motor 6;

the current feedback circuit 14 (the current control unit 10) that performs a feedback correction on the instruction current values based on the current values of the respective u, v, and w phases estimated by the phase current calculation unit 16;

the instruction voltage value correction unit 11 that performs pulse shift control of correcting the phase of the PWM duty signal of the maximum or the middle phase in such a manner that a difference between the switching timings of the PWM duty signals of the maximum and middle phases can reach or exceed the second predetermined value larger than the first predetermined value when the difference between the switching timing of the PWM duty signal of the maximum phase and the switching timing of the PWM duty signal of the middle phase at the timing of the direct-current bus current detection by the phase current calculation unit 16 falls below the first predetermined value, and correcting the phase of the PWM duty signal of the middle or the minimum phase in such a manner that a difference between the switching timings of the PWM duty signals of the middle and minimum phases can reach or exceed the second predetermined value when the difference between the switching timing of the PWM duty signal of the middle phase and the switching timing of the PWM duty signal of the minimum phase at the timing of the direct-current bus current detection by the phase current calculation unit falls below the first predetermined value;

the maximum/middle/minimum voltage determination unit 11a that is provided at the instruction voltage value correction unit 11, and controls pulse shift phase switching control for switching a control target phase on which pulse shift control is performed when the middle phase or the minimum phase is changed into the maximum phase, or the maximum phase or the middle phase is changed into the minimum phase according to a change in the instruction current values; and the second PWM pulse phase operation amount calculation unit 11c that is provided at the instruction voltage value correction unit 11, and sets the correction amount for the phase of the PWM duty signal corresponding to the switching timing at a time that is not the timing of the direct-current bus current detection by the current detection unit 9 to a smaller amount than the correction amount for the phase of the PWM duty signal, at the time of switching the phase on which the pulse shift control is performed in the pulse shift phase switching control.

After the phase for which the phase of the PWM duty signal is corrected is switched, the power supply amount increases for the phase that is newly corrected, affecting the current feedback control. When the correction amount for the phase of the PWM duty signal is changed, the present embodiment sets the correction amount for the phase of the PWM duty signal corresponding to the switching timing at a time that is not the timing of the direct-current bus current detection by the phase current calculation unit to a smaller amount than the correction amount for the phase of the PWM duty signal, thereby reducing this influence.

(11) The second PWM pulse phase operation amount calculation unit 11c performs the phase switching subsequent correction amount adjustment control when the running speed of the vehicle is a predetermined value or lower.

When the running speed of the vehicle is low, the running noise is relatively small, thereby increasing the influence of the noise of the motor control system. The present embodiment can reduce the noise of the motor control system when the running noise is small by the phase switching subsequent correction amount adjustment control.

(12) The present embodiment further includes the torque sensor 34 that detects a steering torque, and the second PWM pulse phase operation amount calculation unit 11c performs the phase switching subsequent correction amount adjustment control when the steering torque is a predetermined value or smaller.

When the steering torque is relatively small, i.e., the vehicle is in a state close to a steering maintaining state in which the electric motor 6 stops working or rotates at an extremely low speed, the pulse shift phase switching control is frequently performed. Therefore, the present embodiment performs the phase switching subsequent correction amount adjustment control in such a state, thereby further reducing the influence on the current feedback control.

(13) The second PWM pulse phase operation amount calculation unit 11c performs the phase switching subsequent correction amount adjustment control in an idle reduction mode to shut down the engine when the vehicle is running or during a temporary stop of the vehicle.

When the vehicle is in the idle reduction mode, the vehicle speed is low (or zero) and the steering torque is often small. When the steering torque is relatively small, i.e., when the vehicle is in a state close to such a steering maintaining state that the electric motor 6 stops working or rotates at an extremely low speed, the pulse shift phase switching control is frequently performed. Therefore, the present embodiment performs the phase switching subsequent correction amount adjustment control in such a state, thereby reducing the influence on the current feedback control.

Other Embodiments

Having described the present invention based on the first embodiment, the specific features of the present invention are not limited to this embodiment, and can be modified within the scope of the present invention. Such a design modification and the like are also included in the present invention.

According to the above-described embodiment, it is possible to improve accuracy of current detection.

According to an embodiment of the present invention, the motor control unit drives and controls the three-phase brushless motor that rotationally drives the driving shaft of the apparatus installed on the vehicle. The motor control unit 8 includes:

the instruction current calculation unit that calculates the instruction current values to be supplied to the three-phase brushless motor based on a driving state of the vehicle;

the PWM control unit that outputs the PWM duty signal to each of the u, v, and w phases of the three-phase brushless motor according to the instruction current values;

the bridge circuit that is constituted by the switching circuit to be driven and controlled by the PWM duty signal, and drives and controls the three-phase brushless motor;

the current sensor that is provided at the direct-current bus connected to the bridge circuit, and detects the direct-current bus current passing through the direct-current bus;

the phase current calculation unit that estimates the current values of the respective u, v, and w phases based on the direct-current bus current when the PWM duty signal of the maximum phase corresponding to a longest power supply time is turned on and the duty signals of the minimum phase corresponding to a shortest power supply time and the middle phase are turned off among the PWM duty signals to the respective u, v, and w phases of the electric motor 6, and the direct-current bus current when the PWM duty signal of the maximum phase is turned on and the PWM duty signal of the middle phase is turned on among the PWM duty signals to the respective u, v, and w phases of the three-phase brushless motor;

the current feedback circuit 14 that performs a feedback correction on the instruction current values based on the current values of the respective u, v, and w phases estimated by the phase current calculation unit;

the pulse shift control circuit that performs pulse shift control of correcting the phase of the PWM duty signal of the maximum or the middle phase in such a manner that a difference between the switching timings of the PWM duty signals of the maximum and middle phases can reach or exceed the second predetermined value larger than the first predetermined value when the difference between the switching timing of the PWM duty signal of the maximum phase and the switching timing of the PWM duty signal of the middle phase at the timing of the direct-current bus current detection by the phase current calculation unit falls below the first predetermined value, and correcting the phase of the PWM duty signal of the middle or the minimum phase in such a manner that a difference between the switching timings of the PWM duty signals of the middle and minimum phases can reach or exceed the second predetermined value when the difference between the switching timing of the PWM duty signal of the middle phase and the switching timing of the PWM duty signal of the minimum phase at the timing of the direct-current bus current detection by the phase current calculation unit falls below the first predetermined value;

the pulse shift phase switching control unit that is provided at the pulse shift control circuit, and controls pulse shift phase switching control for switching a control target phase on which pulse shift control is performed when the middle phase or the minimum phase is changed into the maximum phase, or the maximum phase or the middle phase is changed into the minimum phase according to a change in the instruction current values; and the phase switching subsequent correction amount calculation unit that is provided at the pulse shift control circuit, and sets the correction amount for the phase of the PWM duty signal corresponding to the switching timing at a time that is not the timing of the direct-current bus current detection by the current calculation unit to a smaller amount than the correction amount for the phase of the PWM duty signal, at the time of switching the phase on which the pulse shift control is performed in the pulse shift phase switching control.

(A) In the above-described motor control apparatus, the pulse shift control circuit can correct both the phase that is a control target phase by the pulse shift phase switching control, and the phase that was a control target phase before the switching, and determine the correction amounts for the phases in such a manner that a total of the correction amounts for the both phases after the pulse shift phase switching control becomes substantially equal to a total of the correction amounts for the both phase before the pulse shift phase switching control.

The total of the correction amounts for the phases by the pulse shift control is substantially the same between before and after the switching, therefore simplifying the control.

(B) In the above-described motor control apparatus, the pulse shift control circuit can correct both the phase that is a control target phase by the pulse shift phase switching control, and the phase that was a control target phase before the switching, and determine the correction amounts for the phases in such a manner that a total of the correction amounts for the both phases after the pulse shift phase switching control becomes different from a total of the correction amounts for the both phase before the pulse shift phase switching control.

The correction amount for the phase is variably adjusted according to a change in the driving state of the vehicle and the like, thereby realizing further appropriate pulse shift control.

(C) In the motor control apparatus described in the above item (B), the pulse shift control circuit can determine the correction amounts for the phases in such a manner that a total of the correction amounts for the both phases after the pulse shift phase switching control becomes smaller than a total of the correction amounts for the both phases before the pulse shift phase switching control when a load on the three-phase brushless motor or the rotational speed of the three-phase brushless motor increases.

When a load on the three-phase brushless motor or the rotational speed of the three-phase brushless motor increases, the noise of the three-phase brushless motor is mixed with another noise, whereby the driver rarely feels uncomfortable. On the other hand, when a load on the three-phase brushless motor or the rotational speed of the three-phase brushless motor is small or low, the noise of the three-phase brushless motor is relatively loud, whereby the driver easily feels uncomfortable. By the above control, the noise of the three-phase brushless motor felt by the driver due to the control can be reduced.

(D) In the motor control apparatus described in the above item (C), the rotational speed can be calculated based on the information of the rotational position sensor that detects the rotational position of the rotor of the three-phase brushless motor.

Therefore, it is unnecessary to provide an additional rotational sensor.

(10) According to an embodiment of the present invention, the power steering apparatus includes:

the steering mechanism that turns the wheel to be steered according to a steering operation performed on the steering wheel;

the three-phase brushless motor that provides a steering force to the steering mechanism; and the control apparatus that drives and controls the three-phase brushless motor.

The control unit apparatus includes:

the instruction current calculation unit that calculates the instruction current values to be supplied to three-phase brushless motor based on a driving state of the vehicle;

the PWM control unit that outputs the PWM duty signal to each of the u, v, and w phases of the three-phase brushless motor according to the instruction current values;

the bridge circuit that is constituted by the switching circuit to be driven and controlled by the PWM duty signal, and drives and controls the three-phase brushless motor;

the current sensor that is provided at the direct-current bus connected to the bridge circuit, and detects the direct-current bus current passing through the direct-current bus 13;

the phase current calculation unit that estimates the current values of the respective u, v, and w phases based on the direct-current bus current when the PWM duty signal of the maximum phase corresponding to a longest power supply time is turned on and the duty signals of the minimum phase corresponding to a shortest power supply time and the middle phase are turned off among the PWM duty signals to the respective u, v, and w phases of the three-phase brushless motor, and the direct-current bus current when the PWM duty signal of the maximum phase is turned on and the PWM duty signal of the middle phase is turned on among the PWM duty signals to the respective u, v, and w phases of the three-phase brushless motor;

the current feedback circuit 14 that performs a feedback correction on the instruction current values based on the current values of the respective u, v, and w phases estimated by the phase current calculation unit;

the pulse shift control circuit that performs pulse shift control of correcting the phase of the PWM duty signal of the maximum or the middle phase in such a manner that a difference between the switching timings of the PWM duty signals of the maximum and middle phases can reach or exceed the second predetermined value larger than the first predetermined value when the difference between the switching timing of the PWM duty signal of the maximum phase and the switching timing of the PWM duty signal of the middle phase at the timing of the direct-current bus current detection by the phase current calculation unit 16 falls below the first predetermined value, and correcting the phase of the PWM duty signal of the middle or the minimum phase in such a manner that a difference between the switching timings of the PWM duty signals of the middle and minimum phases can reach or exceed the second predetermined value when the difference between the switching timing of the PWM duty signal of the middle phase and the switching timing of the PWM duty signal of the minimum phase at the timing of the direct-current bus current detection by the phase current calculation unit falls below the first predetermined value;

the pulse shift phase switching circuit that is provided at the pulse shift control circuit, and controls pulse shift phase switching control for switching a control target phase on which pulse shift control is performed when the middle phase or the minimum phase is changed into the maximum phase, or the maximum phase or the middle phase is changed into the minimum phase according to a change in the instruction current values; and the phase switching subsequent correction amount calculation unit that is provided at the pulse shift control circuit, and sets the correction amount for the phase of the PWM duty signal corresponding to the switching timing at a time that is not the timing of the direct-current bus current detection by the current calculation unit to a smaller amount than the correction amount for the phase of the PWM duty signal, at the time of switching the phase on which the pulse shift control is performed in the pulse shift phase switching control.

(E) In the above-described power steering apparatus, the phase switching subsequent correction amount calculation unit can perform the phase switching subsequent correction amount adjustment control when the running speed of the vehicle is a predetermined value or lower.

When the running speed of the vehicle is low, the running noise is relatively small, thereby increasing the influence of the noise of the motor control system. The present embodiment can reduce the noise of the motor control system when the running noise is small by the phase switching subsequent correction amount adjustment control.

(F) The power steering apparatus described in the above item (E) further includes the torque sensor that detects a steering torque, and the phase switching subsequent correction amount calculation unit can perform the phase switching subsequent correction amount adjustment control when the steering torque is a predetermined value or smaller.

When the steering torque is relatively small, i.e., the vehicle is in a state close to a steering maintaining state in which the electric motor 6 stops working or rotates at an extremely low speed, the pulse shift phase switching control is frequently performed. Therefore, the present embodiment performs the phase switching subsequent correction amount adjustment control in such a state, thereby reducing the influence on the current feedback control.

(G) In the above-described power steering apparatus, the phase switching subsequent correction amount calculation unit can perform the phase switching subsequent correction amount adjustment control in an idle reduction mode to shut down the engine when the vehicle is running or during a temporary stop of the vehicle.

When the vehicle is in the idle reduction mode, the vehicle speed is low (or zero) and the steering torque is often small. When the steering torque is relatively small, i.e., when the vehicle is in a state close to such a steering maintaining state that the electric motor 6 stops working or rotates at an extremely low speed, the pulse shift phase switching control is frequently performed. Therefore, the present embodiment performs the phase switching subsequent correction amount adjustment control in such a state, thereby reducing the influence on the current feedback control.

(H) In the above-described power steering apparatus, the phase switching subsequent correction amount calculation unit can set the correction amount for the phase of the PWM duty signal corresponding to the switching timing at a time that is not the timing of the direct-current bus current detection by the phase current calculation unit to 50% of the correction amount for the phase of the PWM duty signal corresponding to the switching timing at the timing of the direct-current bus current detection.

This can minimize a change in the power supply amount due to the pulse shift control at the current detection timing, thereby minimizing the influence on the current feedback control.

(I) In the above-described power steering apparatus, the current calculation unit can estimate the currents of the respective phases using the direct-current bus current detected in the next PWM half cycle of the PWM half cycle where the pulse shift phase switching control is performed among the respective PWM half cycles in the PWM half cycles in which the PWM control unit performs the PWM control.

Therefore, the length of the current detection timing can be minimized, thereby increasing the current detection frequency accordingly to improve the controllability.

(J) In the above-described power steering apparatus, the phase shift control circuit can correct both the phase that is a control target phase by the pulse shift phase switching control, and the phase that was a control target phase before the switching, and determines the correction amounts for the phases in such a manner that a total of the correction amounts for the both phases after the pulse shift phase switching control becomes substantially equal to a total of the correction amounts for the both phases before the pulse shift phase switching control.

The total of the correction amounts for the phases by the pulse shift control is substantially the same between before and after the switching, therefore simplifying the control.

(K) In the above-described power steering apparatus, the phase shift control circuit can correct both the phase that is a control target phase by the pulse shift phase switching control, and the phase that was a control target phase before the switching, and determines the correction amounts for the phases in such a manner that a total of the correction amounts for the both phases after the pulse shift phase switching control becomes different a total of the correction amounts for the both phases before the pulse shift phase switching control.

The correction amount for the phase is variably adjusted according to a change in the driving state of the vehicle and the like, thereby realizing further appropriate pulse shift control.

(L) In the above-described power steering apparatus, the phase shift control circuit can determine the correction amounts for the phases in such a manner that a total of the correction amounts for the both phases after the pulse shift phase switching control becomes smaller than a total of the correction amounts for the both phases before the pulse shift phase switching control, when a load on the three-phase brushless motor or the rotational speed of the three-phase brushless motor increases.

When a load on the motor or the rotational speed of the motor increases, the noise of the motor is mixed with another noise, whereby the driver rarely feels uncomfortable. On the other hand, when a load on the motor or the rotational speed of the motor is small or low, the noise of the motor is relatively loud, whereby the driver easily feels uncomfortable. By the above control, the noise of the motor felt by the driver due to the control can be reduced.

(N) In the power steering apparatus described in the above item (L), the rotational speed is calculated based on the information of the rotational position sensor that detects the rotational position of the rotor of the three-phase brushless motor.

Therefore, it is unnecessary to provide an additional rotational sensor.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Application No. 2013-062334 filed on Mar. 25, 2013. The entire disclosure of Japanese Patent Application No. 2013-062334 filed on Mar. 25, 2013 including specification, claims, drawings and summary is incorporated herein by reference in its entirety.

The entire disclosure of Japanese Patent Application Publication No. 2001-327173 including specification, claims, drawings and summary is incorporated herein by reference in its entirety.

What is claimed is:

1. A motor control apparatus configured to drive and control a three-phase brushless motor configured to rotationally drive a driving shaft of an apparatus installed on a vehicle, the motor control apparatus comprising:

an instruction current calculator configured to calculate an instruction current value to the three-phase brushless motor based on a driving state of the vehicle;

a PWM controller configured to output a PWM duty signal to each phase of the three-phase brushless motor according to the instruction current value;

a bridge circuit including a switching circuit configured to be driven and controlled by the PWM duty signal, and configured to drive and control the three-phase brushless motor;

a current sensor provided at a direct-current bus connected to the bridge circuit, and configured to detect a direct-current bus current passing through the direct-current bus;

a phase current calculator configured to estimate current values of respective phases based on the direct-current bus current when the PWM duty signal of a maximum phase corresponding to a longest power supply time is turned on and the duty signals of a minimum phase corresponding to a shortest power supply time and a middle phase are turned off among the PWM duty signals to the respective phases of the three-phase brushless motor, and the direct-current bus current when the PWM duty signal of the maximum phase is turned on and the PWM duty signal of the middle phase is turned on;

a current feedback circuit configured to perform a feedback correction on the instruction current value based on the current values of the respective phases estimated by the phase current calculator;

a pulse shift control circuit that estimates current values of respective phases based on the direct-current bus current and is configured to perform pulse shift control of correcting a phase of the PWM duty signal of the maximum or the middle phase corresponding to a timing when the PWM duty signal of the maximum or the middle phase is turned on in such a manner that a difference between the timing when the PWM duty signal of the maximum phase is turned on and the timing when the PWM duty signal of the middle phase is turned on can reach or exceed a second predetermined value larger than a first predetermined value when the difference between the timing when the PWM duty signal of the maximum phase is turned on and the timing when the PWM duty signal of the middle phase is turned on falls below the first predetermined value, and correcting a phase of the PWM duty signal of the middle or minimum phase in such a manner that a difference between the timing when the PWM duty signal of the middle phase is turned on and a timing when the PWM duty signal of the minimum phase is turned on can reach or exceed the second predetermined value when the difference between the timing when the PWM duty signal of the middle phase is turned on and the timing when the PWM duty signal of the minimum phase is turned on falls below the first predetermined value;

a pulse shift phase switching controller provided at the pulse shift control circuit, and configured to perform pulse shift phase switching control of switching a control target phase on which the pulse shift control is performed, when the middle phase or the minimum phase is changed into the maximum phase, or the maximum phase or the middle phase is changed into the minimum phase according to a change in the instruction current value; and a phase switching subsequent correction amount calculator provided at the pulse shift control circuit, and configured to perform phase switching subsequent correction amount adjustment control of determining a correction amount for the phase by the pulse shift control in such a manner that a correction amount after the switching becomes smaller than a correction amount before the switching of the phase for which the pulse shift control is performed in the pulse shift switching control.

2. The motor control apparatus according to claim 1, wherein the phase switching subsequent correction amount calculator determines the correction amount for the phase in such a manner that the correction amount after the switching becomes 50 percent of the correction amount before the switching.

3. The motor control apparatus according to claim 1, wherein the phase current calculator estimates the current values of the respective phases with use of the direct-current bus current detected in a next PWM half cycle of a PWM half cycle in which the pulse shift phase switching control is performed among respective PWM half cycles in PWM half cycles in which the PWM controller performs PWM control.

4. The motor control apparatus according to claim 1, wherein the pulse shift control circuit corrects both a phase that is a control target phase by the pulse shift phase switching control, and a phase that was a control target phase before the switching, and determines the correction amounts for the phases in such a manner that a total of the correction amounts for the both phases after the pulse shift phase switching control becomes substantially equal to a total of the correction amounts for the both phases before the pulse shift phase switching control.

5. The motor control apparatus according to claim 1, wherein the pulse shift control circuit corrects both a phase that is a control target phase by the pulse shift phase switching control, and a phase that was a control target phase before the switching, and determines the correction amounts for the phases in such a manner that a total of the correction amounts for the both phases after the pulse shift phase switching control becomes different from a total of the correction amounts for the both phases before the pulse shift phase switching control.

6. The motor control apparatus according to claim 5, wherein the pulse shift control circuit determines the correction amounts for the phases in such a manner that the total of the correction amounts for the both phases after the pulse shift phase switching control becomes smaller than that before the pulse shift phase switching control, when a load on the three-phase brushless motor or a rotational speed of the three-phase brushless motor increases.

7. The motor control apparatus according to claim 6, wherein the rotational speed is calculated based on information of a rotational position sensor configured to detect a rotational position of a rotor of the three-phase brushless motor.

8. A power steering apparatus comprising:
a steering mechanism configured to turn a wheel to be steered according to a steering operation performed on a steering wheel;
a three-phase brushless motor configured to provide a steering force to the steering mechanism;
a control apparatus configured to drive and control the three-phase brushless motor;
an instruction current calculator provided at the control apparatus, and configured to calculate an instruction current value to the three-phase brushless motor based on a driving state of a vehicle;
a PWM controller provided at the control apparatus, and configured to output a PWM duty signal to each phase of the three-phase brushless motor according to the instruction current value;
a bridge circuit provided at the control apparatus, including a switching circuit configured to be driven and controlled by the PWM duty signal, and configured to drive and control the three-phase brushless motor;
a current sensor provided at a direct-current bus connected to the bridge circuit, and configured to detect a direct-current bus current passing through the direct-current bus;
a phase current calculator provided at the control apparatus, and configured to estimate current values of respective phases based on the direct-current bus current when the PWM duty signal of a maximum phase corresponding to a longest power supply time is turned on and the duty signals of a minimum phase corresponding to a shortest power supply time and a middle phase are turned off among the PWM duty signals to the respective phases of the three-phase brushless motor, and the direct-current bus current when the PWM duty signal of the maximum phase is turned on and the PWM duty signal of the middle phase is turned on;
a current feedback circuit provided at the control apparatus, and configured to perform a feedback correction on the instruction current value based on the current values of the respective phases estimated by the phase current calculator;
a pulse shift control circuit that estimates current values of respective phases based on the direct-current bus current and is provided at the control apparatus, and configured to perform pulse shift control of correcting a phase of the PWM duty signal of the maximum or the middle phase corresponding to a timing when the PWM duty signal of the maximum or the middle phase is turned on in such a manner that a difference between the timing when the PWM duty signal of the maximum phase is turned on and the timing when the PWM duty signal of the middle phase is turned on can reach or exceed a second predetermined value larger than a first predetermined value when the difference between the timing when the PWM duty signal of the maximum phase is turned on and the timing when the PWM duty signal of the middle phase is turned on falls below the first predetermined value, and correcting a phase of the PWM duty signal of the middle or minimum phase in such a manner that a difference between the timing when the PWM duty signal of the middle phase is turned on and a timing when the PWM duty signal of the minimum phase is turned on can reach or exceed the second predetermined value when the difference between the timing when the PWM duty signal of the middle phase is turned on and the timing when the PWM duty signal of the minimum phase is turned on falls below the first predetermined value;
a pulse shift phase switching controller provided at the pulse shift control circuit, and configured to perform pulse shift phase switching control of switching a control target phase on which the pulse shift control is performed when the middle phase or the minimum phase is changed into the maximum phase, or the maximum phase or the middle phase is changed into the minimum phase according to a change in the instruction current value; and
a phase switching subsequent correction amount calculator provided at the pulse shift control circuit, and configured to determine a correction amount for the phase by the pulse shift control in such a manner that a correction amount after the switching becomes smaller than a correction amount before the switching of the phase for which the pulse shift control is performed in the pulse shift switching control.

9. The power steering apparatus according to claim 8, wherein the phase switching subsequent correction amount calculator performs the phase switching subsequent correction amount adjustment control when a running speed of the vehicle is a predetermined value or lower.

10. The power steering apparatus according to claim 9, further comprising a torque sensor configured to detect a steering torque,
wherein the phase switching subsequent correction amount calculator performs the phase switching subsequent correction amount adjustment control when the steering torque is a predetermined value or smaller.

11. The power steering apparatus according to claim 8, wherein the phase switching subsequent correction amount calculator performs the phase switching subsequent correction amount adjustment control, in an idle reduction mode to shut down an engine when the vehicle is running or during a temporary stop of the vehicle.

12. The power steering apparatus according to claim 8, wherein the phase switching subsequent correction amount calculator determines the correction amount for the phase in such a manner that the correction amount after the switching becomes 50 percent of the correction amount before the switching.

13. The power steering apparatus according to claim 8, wherein the phase current calculator estimates the current values of the respective phases with use of the direct-current bus current detected in a next PWM half cycle of a PWM half cycle where the pulse shift phase switching control is performed among respective PWM half cycles in PWM half cycles in which the PWM controller performs PWM control.

14. The power steering apparatus according to claim 8, wherein the pulse shift control circuit corrects both a phase that is a control target phase by the pulse shift phase switching control, and a phase that was a control target phase before the switching, and determines the correction amounts for the pulses in such a manner that a total of the correction amounts for the both phases after the pulse shift phase switching control becomes substantially equal to a total of the correction amounts for the both phases before the pulse shift phase switching control.

15. The power steering apparatus according to claim 8, wherein the pulse shift control circuit corrects both a phase that is a control target phase by the pulse shift phase switching control, and a phase that was a control target phase before the switching, and determines the correction amounts for the pulses in such a manner that a total of the correction amounts for the both phases after the pulse shift phase switching control becomes different from a total of the correction amounts for the both phases before the pulse shift phase switching control.

16. The power steering apparatus according to claim 15, wherein the pulse shift control circuit determines the correction amounts for the phases in such a manner that the total of the correction amounts for the both phases after the pulse shift phase switching control becomes smaller than that before the pulse shift phase switching control, when a load on the three-phase brushless motor or a rotational speed of the three-phase brushless motor increases.

17. The power steering apparatus according to claim 16, wherein the rotational speed is calculated based on information of a rotational position sensor configured to detect a rotational position of a rotor of the three-phase brushless motor.

* * * * *